(12) United States Patent
Hemmi

(10) Patent No.: US 7,822,952 B2
(45) Date of Patent: Oct. 26, 2010

(54) CONTEXT SWITCHING DEVICE

(75) Inventor: Masanori Hemmi, Kyoto (JP)

(73) Assignee: Panasonic Corporation, Osaka (JP)

( * ) Notice: Subject to any disclaimer, the term of this patent is extended or adjusted under 35 U.S.C. 154(b) by 811 days.

(21) Appl. No.: 11/538,542

(22) Filed: Oct. 4, 2006

(65) Prior Publication Data

US 2007/0083865 A1    Apr. 12, 2007

(30) Foreign Application Priority Data

Oct. 6, 2005    (JP) .............................. 2005-294190

(51) Int. Cl.
- G06F 7/38    (2006.01)
- G06F 9/00    (2006.01)
- G06F 9/44    (2006.01)

(52) U.S. Cl. ...................................... 712/220; 712/228
(58) Field of Classification Search ................. 712/220, 712/226; 710/260
See application file for complete search history.

(56) References Cited

U.S. PATENT DOCUMENTS

| 4,974,143 | A | 11/1990 | Yamada |
| 6,981,083 | B2 * | 12/2005 | Arimilli et al. ............. 710/260 |
| 2003/0149864 | A1 | 8/2003 | Furukawa et al. |
| 2006/0004992 | A1 * | 1/2006 | Fujisawa et al. ........... 712/226 |

FOREIGN PATENT DOCUMENTS

| JP | 1-3739 | 1/1989 |
| JP | 9-288585 | 11/1997 |
| JP | 2002-268942 | 9/2002 |
| JP | 2002-312302 | 10/2002 |
| JP | 2003-271399 | 6/2003 |

OTHER PUBLICATIONS

English language Abstract of JP 2003-271399.
English language Abstract of JP 1-3739, Jan. 9, 1989.
English language Abstract of JP 2002-268942, Sep. 20, 2002.
English language Abstract of JP 2002-312302, Oct. 25, 2002.
English language Abstract of JP 9-288585, Nov. 4, 1997.

* cited by examiner

*Primary Examiner*—Alford W Kindred
*Assistant Examiner*—Jesse R Moll
(74) *Attorney, Agent, or Firm*—Greenblum & Bernstein P.L.C.

(57) ABSTRACT

Provided is a context switching device capable of reducing conflicts among accesses due to retrieving and saving of contexts by plural processors.

The context switching device has: a transfer unit which transfers context data, according to one of (i) the first transfer mode in which the context data is transferred continuously through cycles by a processor, and (ii) the second transfer mode in which plural pieces of the context data are transferred alternately per cycle by switching respective processors of the context data; and a control unit which (i) decides the processor to be used in the first transfer mode and the processors to be used in the second transfer mode, when there is a conflict in requests of the processors for switching context data, the number of processors being more than M, and (ii) controls the transfer unit based on the decision.

20 Claims, 18 Drawing Sheets

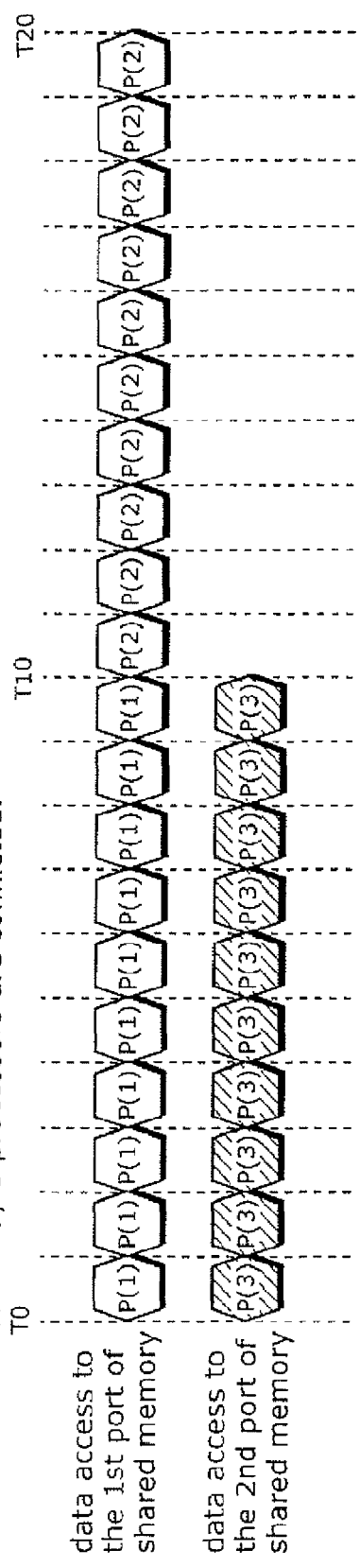
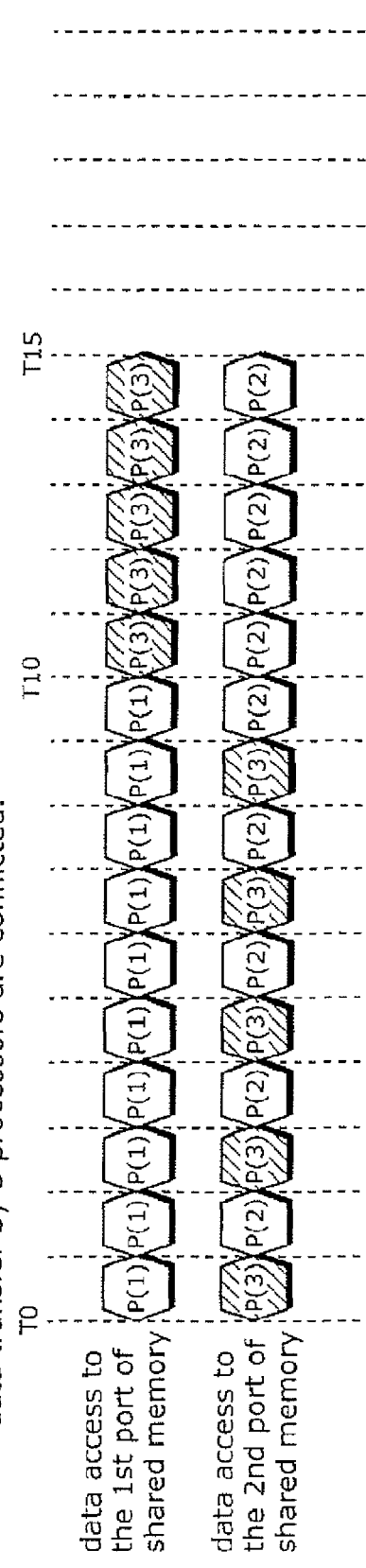
FIG. 7

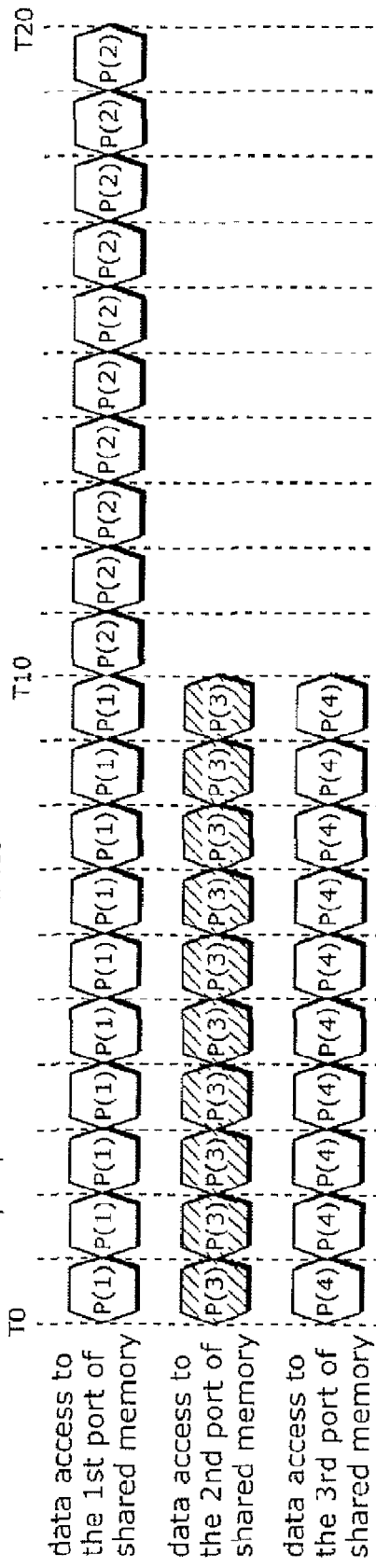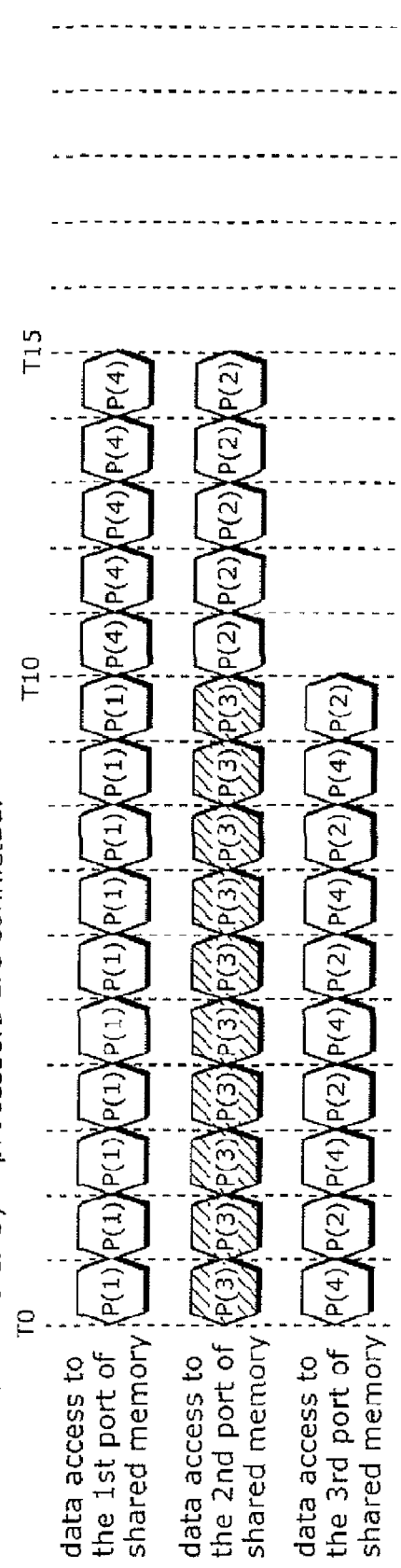
FIG. 8

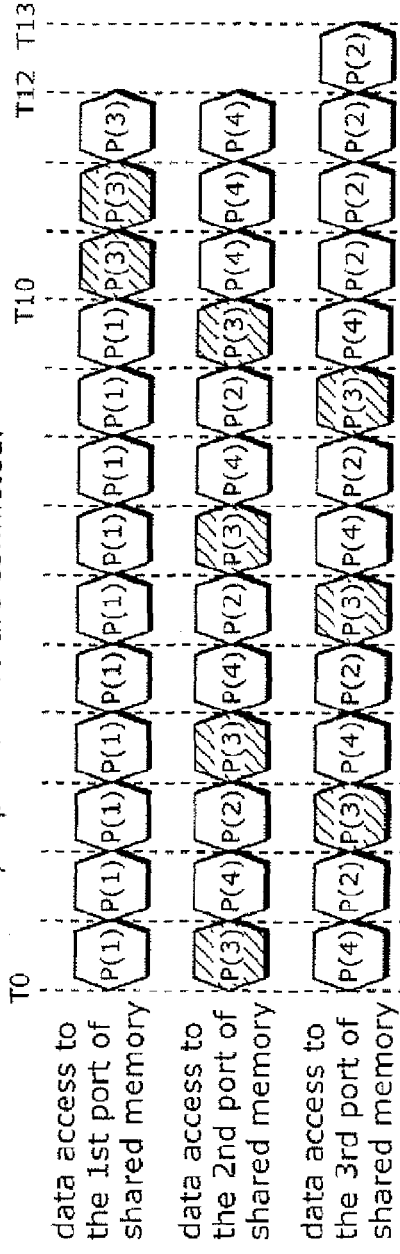
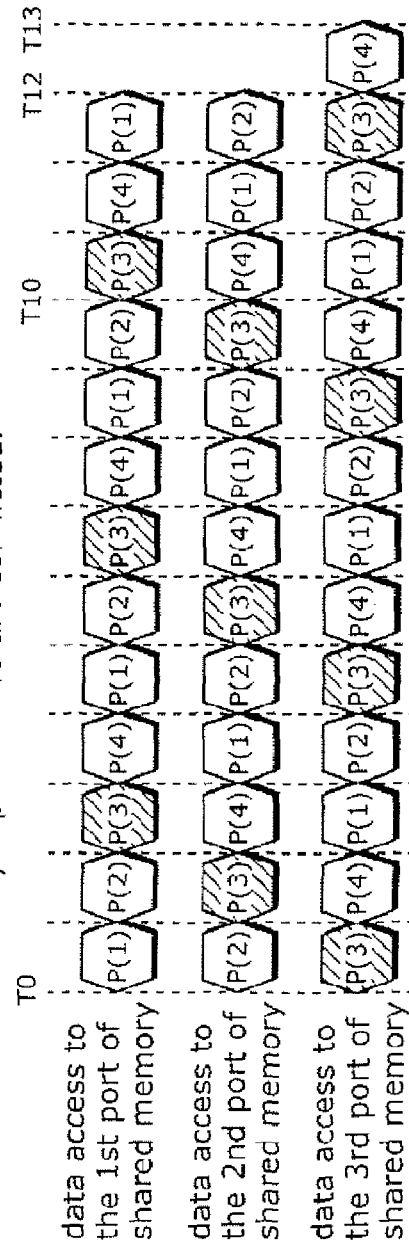
FIG. 9

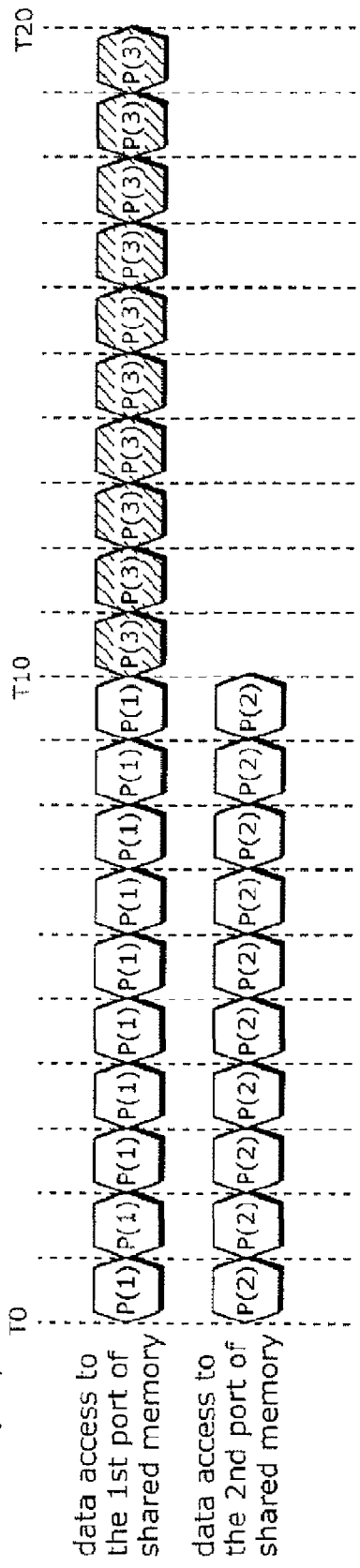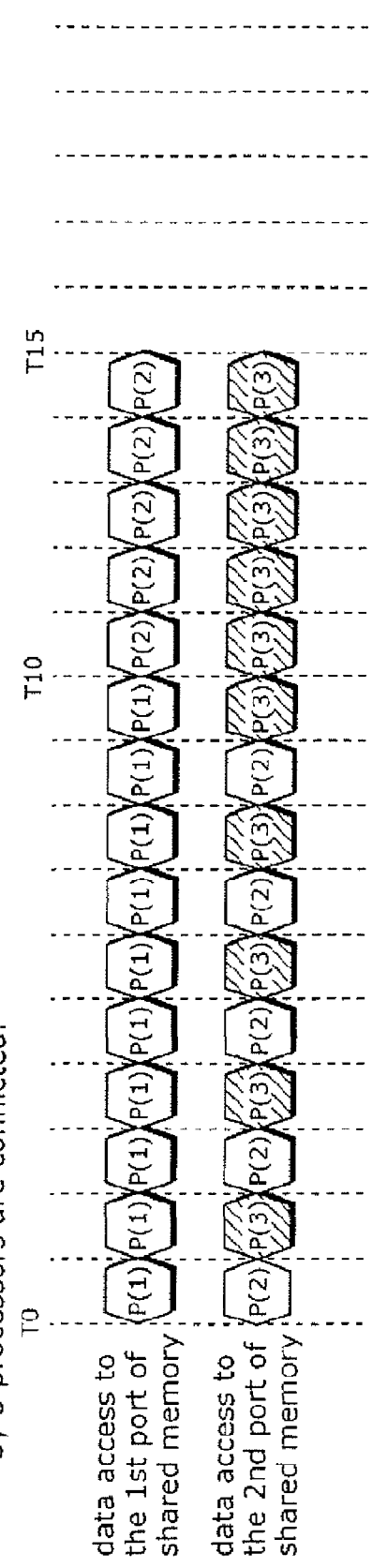

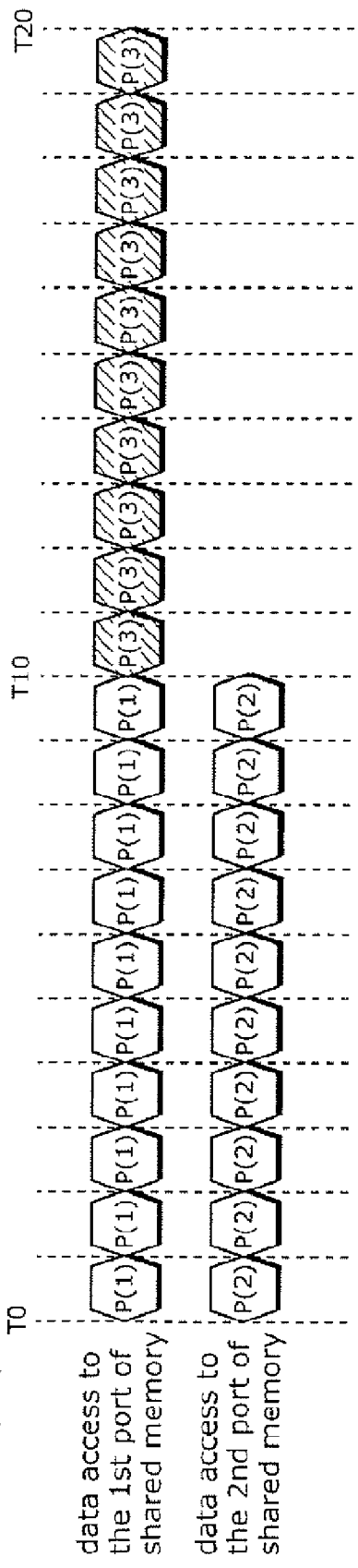
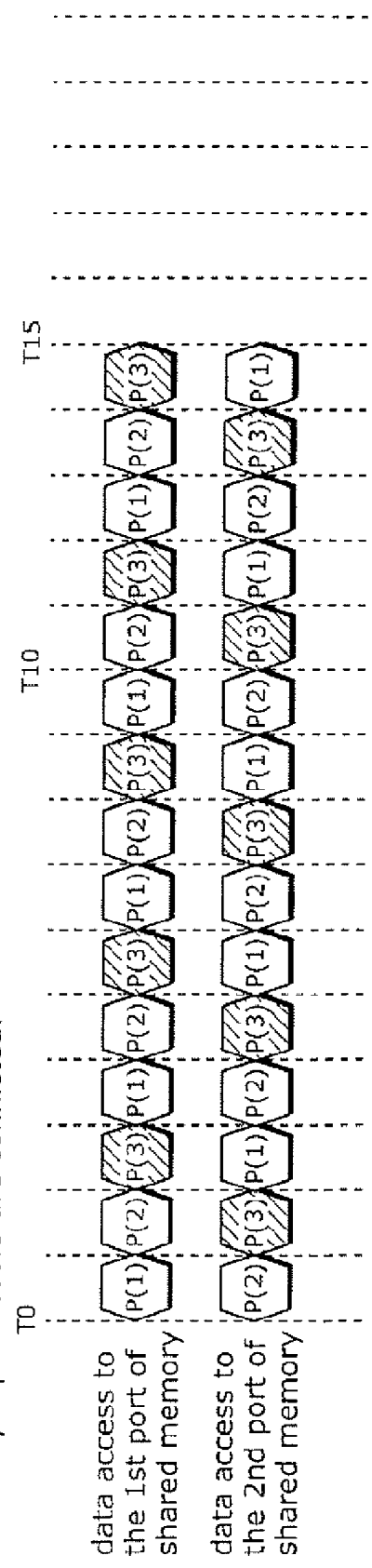
FIG. 11

FIG. 14
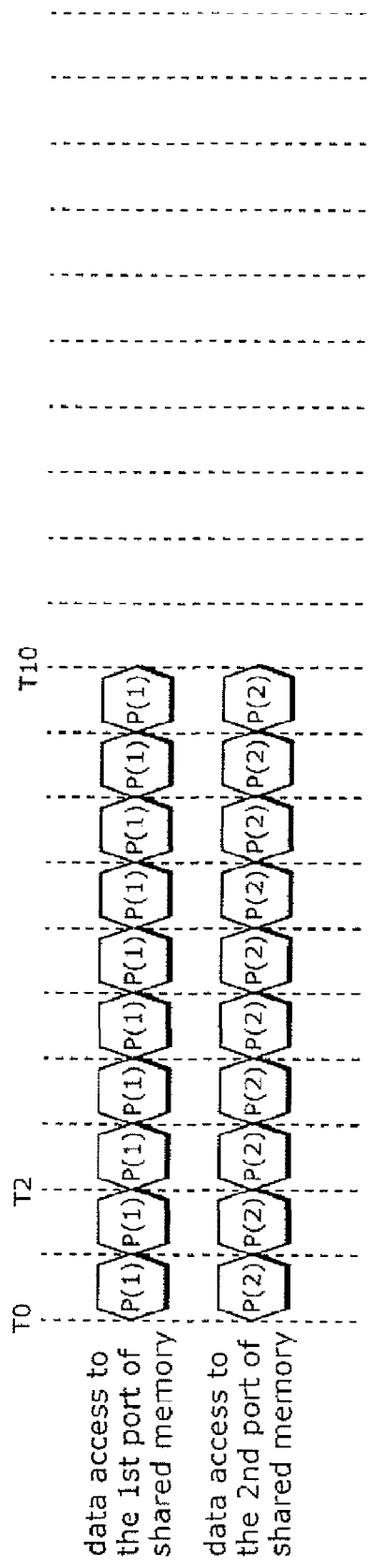
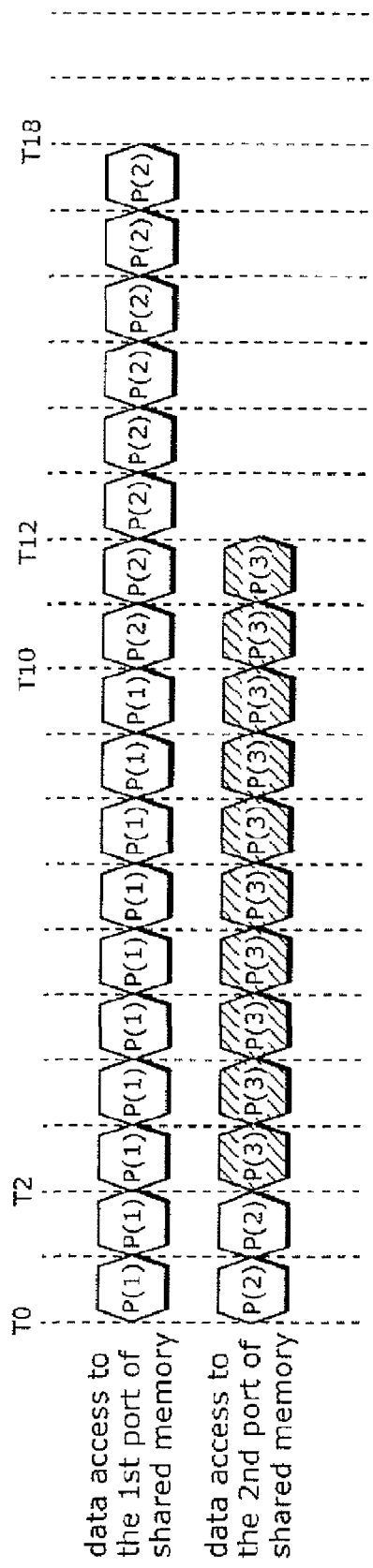

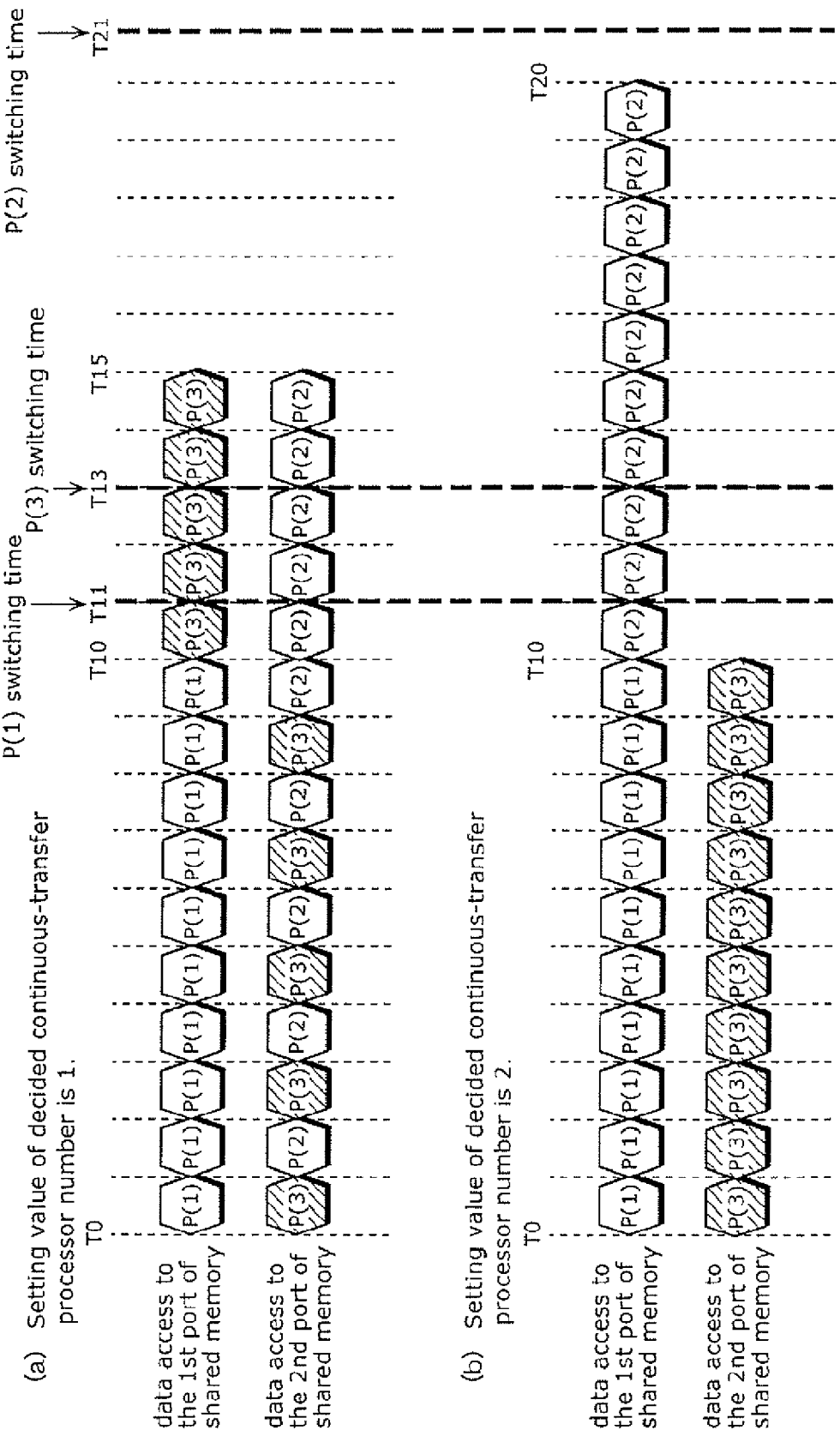

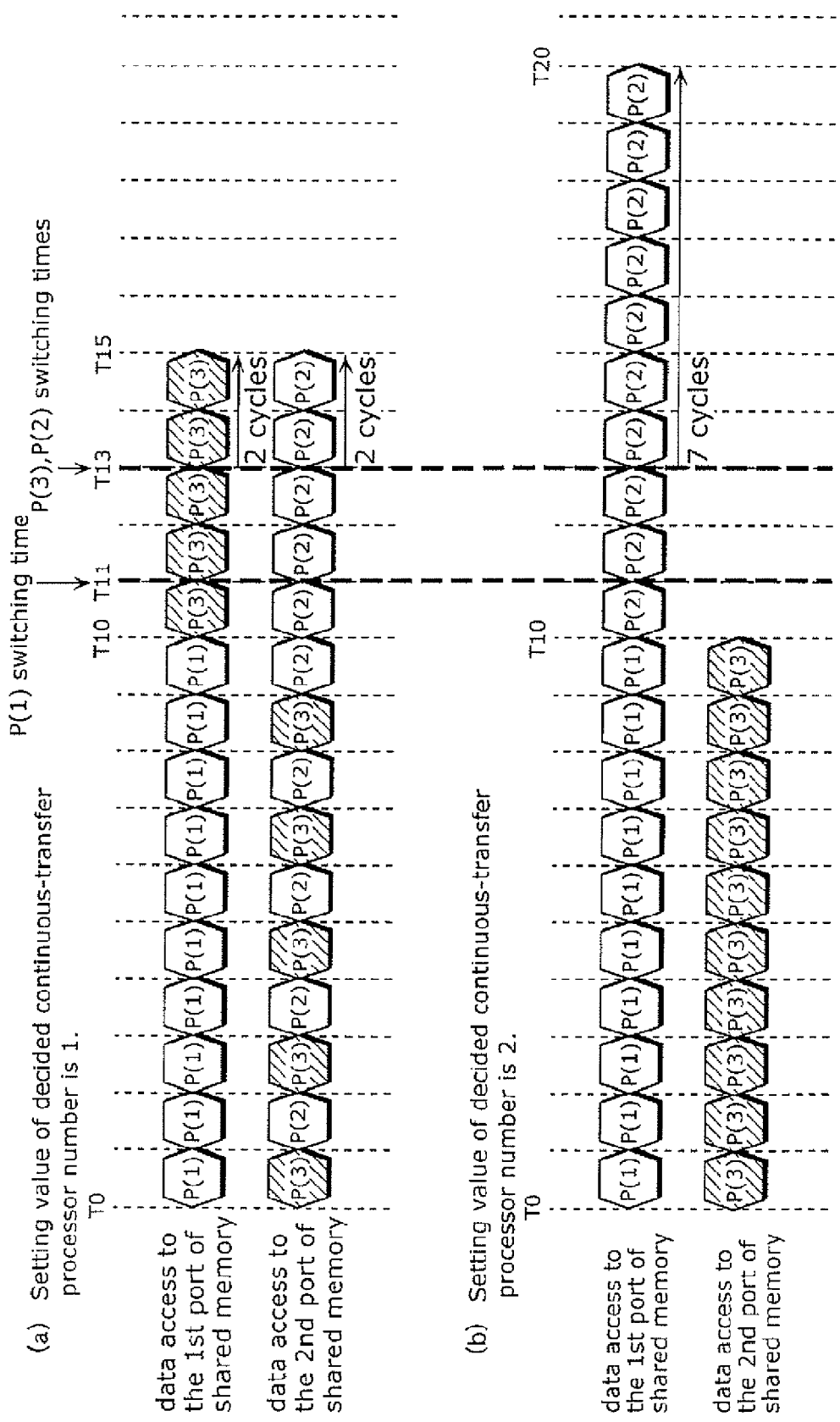

CONTEXT SWITCHING DEVICE

BACKGROUND OF THE INVENTION (1) Field of the Invention

The present invention relates to processors, and more particularly to a technology for executing programs efficiently in a multiprocessor system.

(2) Description of the Related Art

In a parallel processing system, in which a single processor executes various programs in parallel, the processor switches tasks according to a predetermined trigger. A task is a unit to be carried out by the processor for the program execution. In this manner, multiple programs are executed seemingly in parallel by a single processor.

Since each of the tasks is executed by the processor as if the processor were used for the task exclusively, tasks seem to be allocated to respective virtual processors to be executed.

The virtual processor does not need to have all the functions of a real processor, but needs to have only information necessary to execute tasks. Examples of such information are data information and control information regarding a program counter, a flag register, a stack area, a general-purpose register, and the like. Such information necessary to execute a task is called a "context" or "context data".

When a task that is currently executed is to be switched to another task, contexts must be switched. In general, contexts are stored in a memory. Therefore, switching contexts means writing a context of a current task into the memory (hereinafter, referred to as "saving"), and then reading another context of a next task to be executed from the memory (hereinafter, referred to as "retrieving").

Conventionally, the context switching has been implemented not only in operating systems (OS), but also in hardware as disclosed in Japanese Patent Application Laid-Open No. 2003-271399. The hardware which performs the context switching is called a context switching device.

FIG. 1 is a functional block diagram showing an overall structure of the conventional context switching device.

As shown in FIG. 1, the conventional context switching device includes: a context switching device 1001, a processor 1002, and a memory 1003. The memory 1003 holds contexts. Note that FIG. 1 shows only functional blocks necessary to explain the context switching processing concisely.

The processor 1002 has a processor unit 1004, a set of registers A 1005, another set of registers B 1006, and a context selection unit 1007. Contexts are stored into the sets of registers.

The processor 1002 switches tasks in the following processing. Here, it is assumed that a currently executed task is a task 1, and the task 1 is to be switched to a task 2. It is also assumed that a context of the currently executed task 1 is now stored in the register set A 1005.

Firstly, a context of the next task 2 to be executed is retrieved from the memory 1003 to the register set B 1006.

Next, when the current task 1 is to be switched to the task 2, the processor unit 1004 accesses the register set B 1006, and the context switching device 1001 accesses the register set A 1005, under the control of the context selection unit 1007.

Then, in starting execution of the task 2, the context of task 1 in the register set A 1005 is saved into the memory 1003.

FIGS. 2A and 2B are diagrams explaining this context switching processing. Firstly, a premise of the processing is described with reference to FIG. 2A.

Here, for example, two programs of a program (1) and a program (2) are to be executed by the processor 1002. The processing is performed as if the programs were allocated to two independent virtual processors, respectively. Such a virtual processor is called a logical processor (hereinafter, referred to as a LP). Then, by switching tasks between the programs (1) and (2), the processor 1002 executes these programs. Hereinafter, execution of program (1) by the processor 1002 is expressed, for example, as "execution of LP(1) by the processor 1002".

FIG. 2B is a diagram showing a relationship between: a in request for retrieving of a context of LP(2); and a time period for executing LP(1) and LP(2) by the processor 1002. Hereinafter, the time period of executing a LP is referred to as a "execution time".

The processor 1002 starts execution of LP(1) at time T0, and at time T3, switches LP(1) to LP(2) to be executed.

Prior to starting the execution of LP(2) at time T3, retrieving a context of LP(2) starts at time T1. Note that a trigger for retrieving a context is referred to as a "context retrieving request", A data transfer control unit 1009 in the context switching device 1001 starts retrieving the context when a context retrieving request occurs, and completes the retrieving at time T2.

Note that a trigger for saving a context is referred to as a "context saving request". Hereinafter, both of the "context retrieving request" and the "context saving request" are referred to as a "context switching request".

The context switching requests are generated inside the context switching device 1001. Although various techniques can be conceived to generate the requests, in this example, a context switching request is generated when a certain amount of time has passed after the start of an execution time of each LP. The execution time of each LP is counted by the counter 1500 of FIG. 1.

Furthermore, although various techniques can be conceived to decide a timing of context switching, in this example, a trigger far context switching is generated inside the context switching device 1001, when an execution time of a LP counted by the counter 1500 reaches a certain time period.

According to this conventional example, it is sure that overhead due to the context switching is not generated when a single processor is used, and thereby the single processor can switch tasks efficiently.

In the meantime, in order to speed up the processing, increasing the number of processors while reducing the number of shared memories is recently desirable.

However, in this case, the following problem arises. As described above, the processor 1002 executes multiple tasks seemingly in parallel. When there are a plurality of such processors operated in parallel, and all contexts of tasks to be executed by the processors are stored in the shared memory, there are often conflicts among accesses from the plural processors to the shared memory, in other words, retrieving and saving for multiple contexts. This results in a problem of generating latency from completion of execution of a current task to start of execution of a next task.

This problem is discussed in more detail by referring again to FIG. 2B. Originally, retrieving of the context of LP(2) is completed by time T2, and LP(1) is switched to LP(2) at time T3. However, due to the conflict among plural accesses to the shared memory, the context retrieving is often delayed and completed after time T3. In such a situation, execution of LP(2) cannot start at time T3, but should be suspended until the context retrieving is completed. As a result, the task switching requires an extra time spent waiting.

SUMMARY OF THE INVENTION

In order to solve the above problem, an object of the present invention is to provide a context switching device capable of reducing such access conflict due to retrieving and saving by plural processors.

In order to achieve the above object, a context switching device is used in a parallel processing system having: N processors which execute multiple programs while switching the programs to be executed; and a shared memory which has M, where M<N, access ports and holds context data which are used by the processors to execute the programs and obtained from the processors. The context switching device switches the context data, when these context data are transferred at the same time between the shared memory and each of the processors. The context switching device includes: a transfer unit which transfers context data, according to one of (i) a first transfer mode in which the contexts data is transferred continuously through cycles by a processor, and (ii) a second transfer mode in which plural pieces of the context data are transferred alternately per cycle by switching respective processors of the context data; and a control unit which (i) decides the processor to be used in the first transfer mode and the processors to be used in the second transfer mode, and (ii) controls the transfer unit based on the decision, when there is a conflict in requests of the processors for switching context data, the number of processors being more than M.

Thereby, even if the plural processors simultaneously transfer context data to the shared memory, influence of the conflict among accesses to the shared memory on the context switching processing becomes minimum, thereby reducing significantly a time loss caused in the context switching processing. Thus, in order to solve the above problem, it is possible to provide a context switching device capable of reducing the access conflicts due to retrieving and saving by plural processors.

Note that the present invention can be realized not only as the context switching device, but also as: a parallel processing system including the context switching device; a large-scale integration (LSI) in which the context switching device is integrated; a context switching method including processing which is performed and characterized by the context switching device; a program causing a computer to execute the processing; and the like. The program can be, of course, distributed via a recording medium such as a CD-ROM or a transmission medium such as the Internet.

As apparent from the above explanation, according to the present invention, even if plural processors transfer context data simultaneously to a shared memory, influence of conflicts among accesses to the shared memory on task switching processing becomes minimum, so that it is possible to significantly reduce a time loss caused in task switching processing and eventually the context switching processing to execute programs.

Accordingly, the present invention is highly suitable for practical use, in recent days overheads have been reduced and parallel processing systems have been widely used.

Further Information About Technical Background to this Application

The disclosure of Japanese Patent Application No. 2005-294190 filed on Oct. 6, 2005 including specification, drawings and claims is incorporated herein by reference in its entirety.

BRIEF DESCRIPTION OF THE DRAWINGS

These and other objects, advantages and features of the present invention will become apparent from the following description thereof taken in conjunction with the accompanying drawings that illustrate specific embodiments of the present invention. In the Drawings:

FIG. 7 shows timing charts of context data transfer, where the number of operable processors (N) is 3, the number of context memories (M) is 2, and setting of a continuous-transfer processor number 111 is selected to be used in context switching processing;

FIG. 8 shows timing charts of context data transfer, where N is 4, M is 3, and setting of the continuous-transfer processor number 111 is selected to be used in context switching processing;

FIG. 9 shows timing charts of context data transfer, where N is 4, M is 3, and setting of the continuous-transfer processor number 111 is selected to be used in context switching processing;

FIG. 10 shows timing charts of context data transfer, where setting of a context transfer attribute 112 is used in context switching processing;

FIG. 11 shows timing charts of context data transfer, where setting of the context transfer attribute 112 is used in context switching processing;

FIG. 14 shows timing charts of context data transfer, where a transfer stop control unit 131 is used;

FIG. 17 shows timing charts of context data transfer where tMAX is a value of 0, according to the second embodiment of the present invention; and FIG. 18 shows timing charts of context data transfer where tMAX is not a value of 0, according to the second embodiment of the present invention.

DESCRIPTION OF THE PREFERRED EMBODIMENT(S)

The following describes the embodiments according to the prevent invention with reference to the drawings.

First Embodiment

Figure 1:
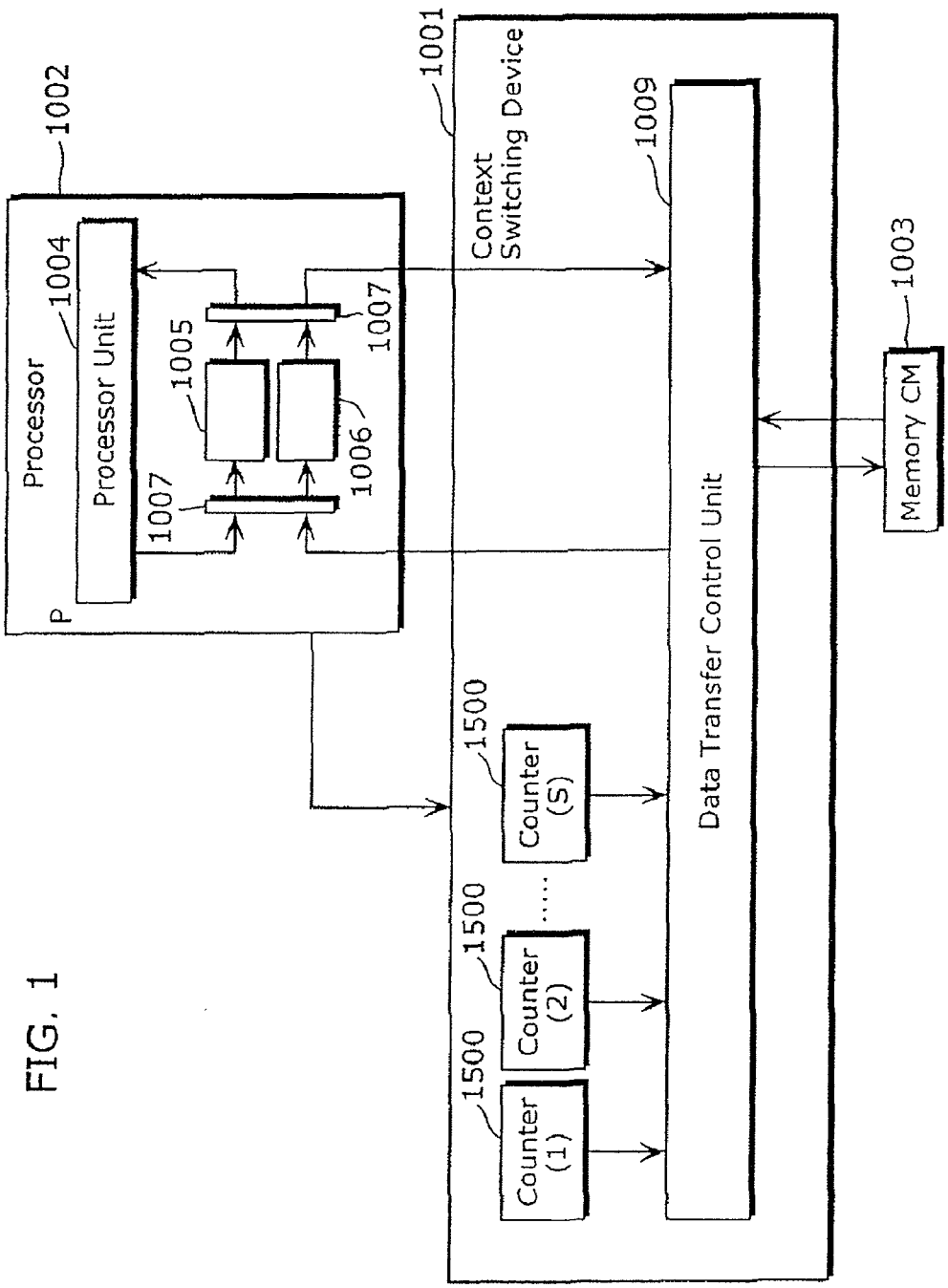
FIG. 1 is a functional block diagram showing an overall structure of a parallel processing system having the conventional context switching device.
Figure 2A:
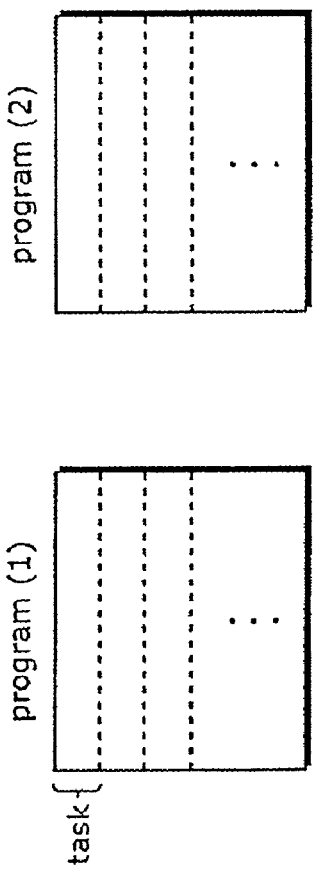
FIG. 2A is a diagram showing a relationship among programs, LPs, and a processor, according to the conventional context switching device.
Figure 2B:
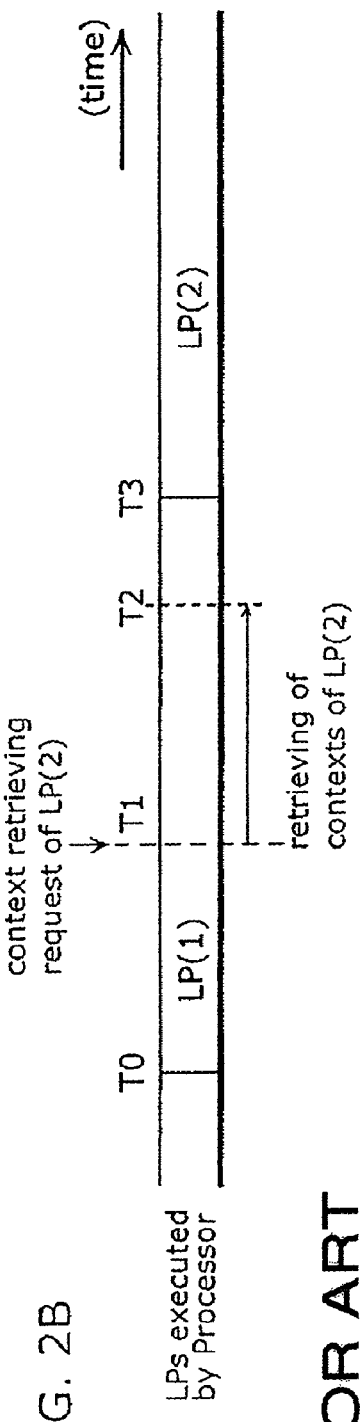
FIG. 2B is a diagram for explaining context switching processing, according to the conventional context switching device.
Figure 3:
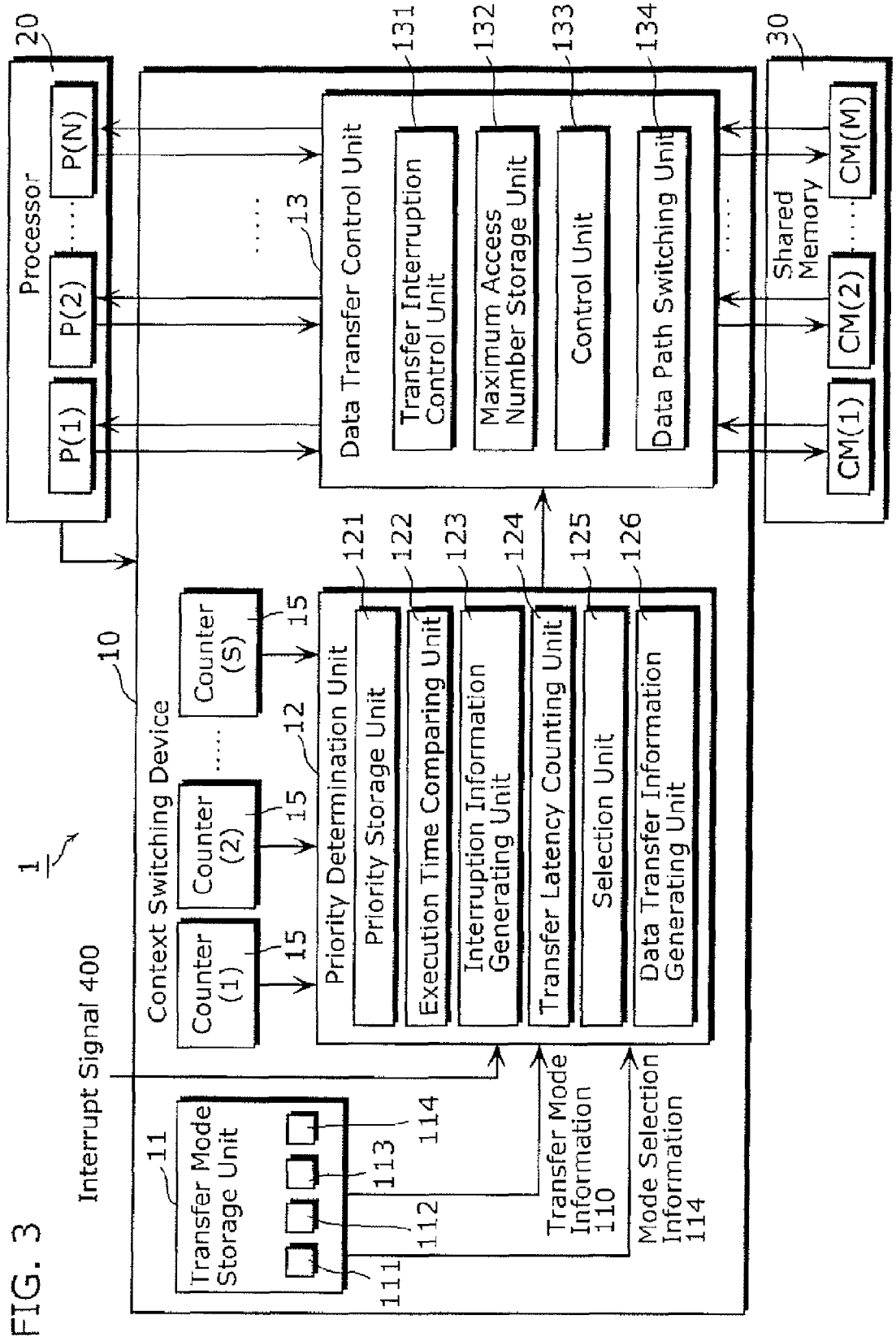
FIG. 3 is a functional block diagram showing an overall structure of a parallel system having a context switching device according to the first embodiment of the present invention.

FIG. 3 is a functional block diagram showing an overall structure of a parallel processing system having a context switching device according to the first embodiment of the present invention.

As shown in FIG. 3, a parallel processing system 1 has a context switching device 10, a processor 20, and a shared memory 30. The processor 20 has a plurality of physical processors. The shared memory 30 has a plurality of context memories. Retrieving and saving of context data between the processor 20 and the shared memory 30 are performed via the context switching device 10.

The context switching device 10 has a transfer mode storage unit 11, a priority determination unit 12, a data transfer control unit 13, and a plurality of counters 15.

The transfer mode storage unit 11 has registers. In a system mode where the processor 20 serves as a single processor, the transfer mode storage unit 11 receives information regarding modes for transferring contexts (hereinafter, referred to as transfer mode information) from the processor 20. The transfer mode information includes a continuous-transfer processor number 111, a context transfer attribute 112, selection information 113, and mode selection information 114.

Based on the transfer mode information stored in the transfer mode storage unit 11, another information regarding priorities of transferring contexts (hereinafter, referred to as priority information) which is given from the processor 20 in the above-mentioned system mode, and the like, the priority determination unit 12 generates information necessary in the data transfer control unit 13. The priority determination unit 12 includes a priority storage unit 121, a execution time comparing unit 122, an interruption information generating unit 123, a transfer latency counting unit 124, a selection unit 125, and a data transfer information generating unit 126.

Based on information generated by the priority determination unit 12, the data transfer control unit 13 automatically switches an order of transferring contexts in order to reduce access conflicts caused when plural processors tempt to retrieve or save contexts simultaneously. The data transfer control unit 13 includes a transfer stop control unit 131, a maximum accesses number storage unit 132, a control unit 133, and a data path switching unit 134.

Each of counters 15 in the context switching device 10 counts a remaining time in an execution time period of each LP, by counting the number of cycles allocated in the execution time period for the LP.

Note that a transfer unit recited in the appended claims corresponds to the data path switching unit 134 in the data transfer control unit 13. Note also that a control unit recited in the appended claims corresponds to a set of the transfer mode storage unit 11; the priority determination unit 12; and the transfer stop control unit 131, the maximum access number storage unit 132, and the control unit 133 in the data transfer control unit 13.

Next, respective structures of the transfer mode storage unit 11, the priority determination unit 12, and the data transfer control unit 13 are described in detail below.

Figure 4:
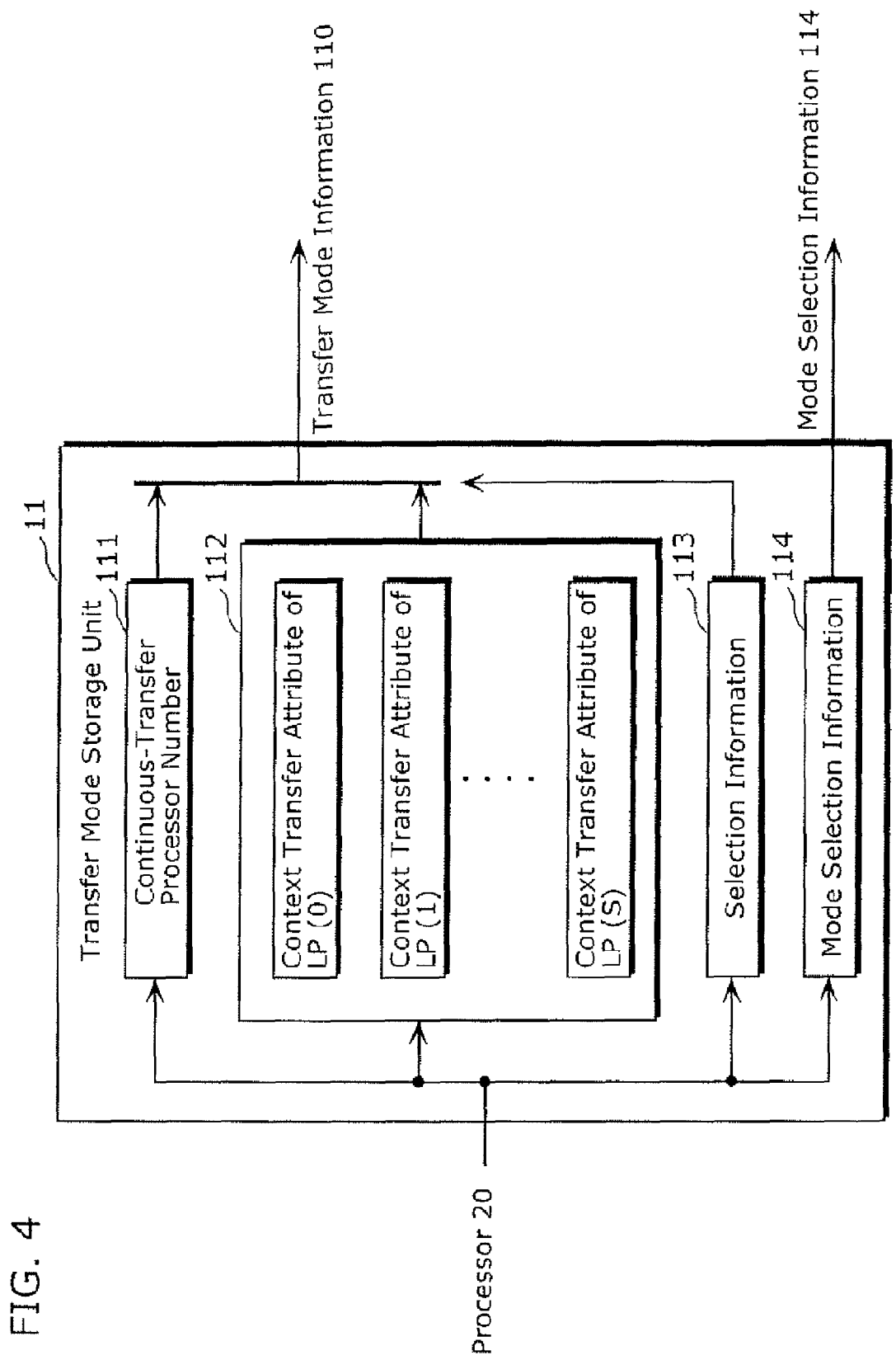
FIG. 4 is a functional block diagram of a transfer mode storage unit 11.

Firstly, a structure of the transfer mode storage unit 11 is described with reference to FIG. 4. As mentioned above, the transfer mode information includes four kinds of information, which are the continuous-transfer processor number 111, the context transfer attribute 112, the selection information 113, and the mode selection information 114.

The continuous-transfer processor number 111 is information which represents how many continuous-transfer processors are operable when a conflict occurs among context switching requests for multiple LPs. Note that the continuous-transfer processor is a processor which transfers plural contexts (plural pieces of context data) continuously without stopping or interruption. The shared memory 30 can receive data transferred from maximum M processors. Therefore, regarding the continuous-transfer processor number 111, an effective minimum setting value of is "0", and an effective maximum setting value is "M".

The context transfer attribute 112 is an attribute which indicates, for each LP, whether or not context data is to be transferred continuously. Here, it is assumed that a maximum number of LPs which can be executed in the entire processor 20 is "S".

The selection information 113 is information regarding selection of the continuous-transfer processor number 111 or the context transfer attribute 112, as effective information to be used in context switching processing. The continuous-transfer processor number 111 or the context transfer attribute 112 selected by the selection information 113 is outputted as the transfer mode information 110.

The mode selection information 114 is used when the selection unit 125 in the priority determination unit 12 selects: information generated by the priority storage unit 121; or information generated by the execution time comparing unit 122.

Figure 5:
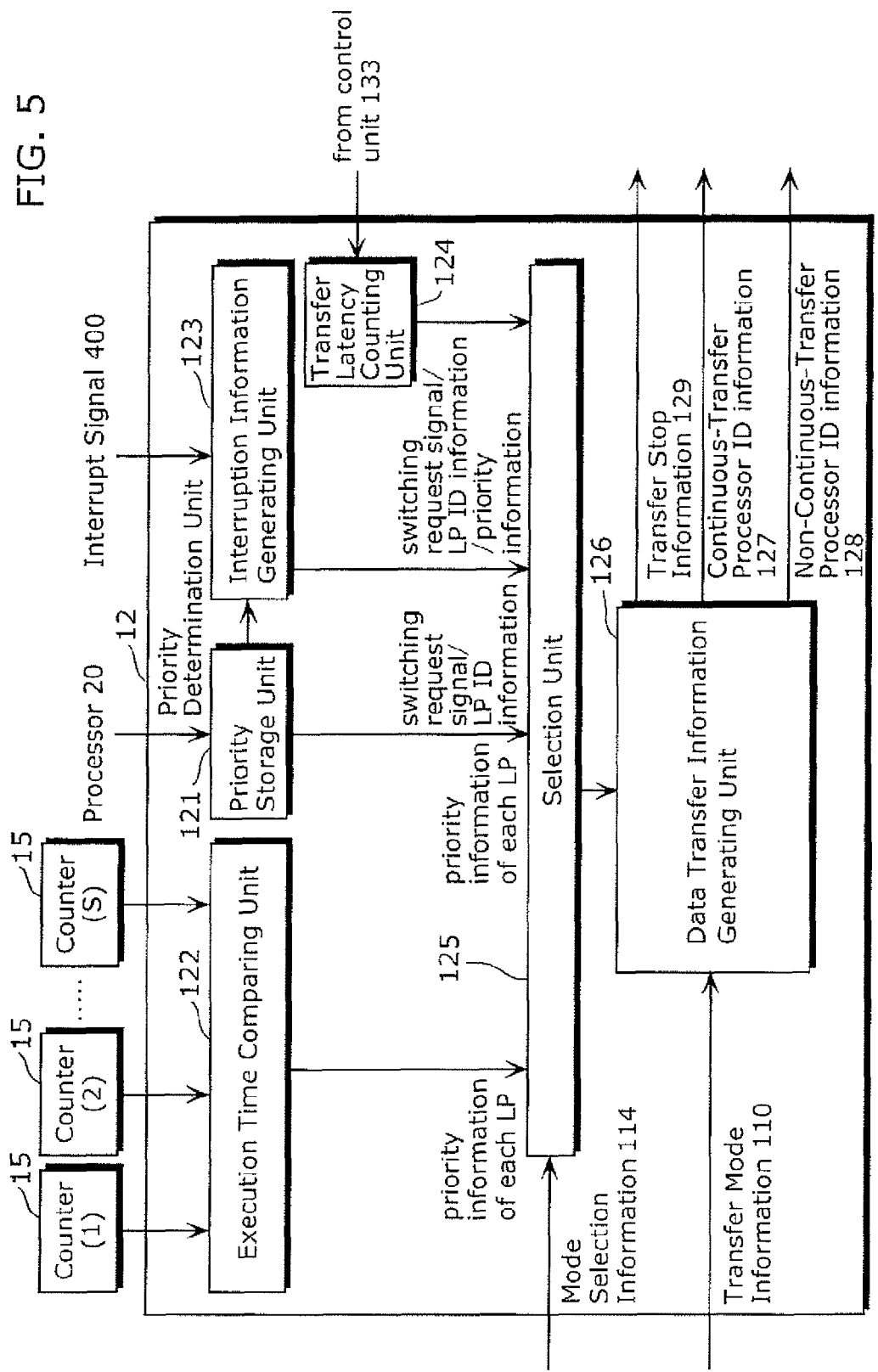
FIG. 5 is a functional block diagram of a priority determination unit 12.

Next, a structure of the priority determination unit 12 is described with reference to FIG. 5.

The priority determination unit 12 includes, as mentioned above, the priority storage unit 121, the execution time comparing unit 122, the interruption information generating unit 123, the transfer latency counting unit 124, the selection unit 125, and the data transfer information generating unit 126.

The priority storage unit 121 stores the above-mentioned priority information which represents priorities assigned to LPs for transferring contexts. This priority information has up to S kinds of information. Here, for convenience, it is assumed that priority information "1" represents the highest priority, and priorities are gradually lowered from priority information "1", "2", . . . , "S". For example, when S is 3, there are three LPs of LP(1), LP(2), and LP(3). In this example, if priorities of transferring plural context data of the three LPs are lowered gradually from LP(2), LP(1), and LP(3), the priority information of LP(1), LP(2), and LP(3) become "2", "1", and "3", respectively. Note that the processor 20 stores the priority information into the priority storage unit 121 in the above-mentioned system mode.

The execution time comparing unit 122 receives a value counted by each counter 15 which counts a remaining time in the execution time by counting remaining cycles until next task switching. Then, the execution time comparing unit 122 generates information by assigning the counted value with priority information. Here, a shorter remaining time is assigned with a higher priority.

When an interrupt signal 400 is inputted from the outside, the interruption information generating unit 123 identifies a number for identifying a LP (hereinafter, referred to as an ID or a LP ID) corresponding to the interrupt signal 400, and further specifies priority information of the identified LP. Then, the interruption information generating unit 123 outputs, to the selection unit 125, the obtained ID, the specified priority information, and a switching request signal requesting to switch current transferring context data to context data of the identified LP.

Based on information from the control unit 133 in the data transfer control unit 13, the transfer latency counting unit 124 counts how many times target context data transfer is skipped due to other preceding transfers, in other words, the number of LPs which have transferred prior to the target LP, after context data of the target LP goes into a status of waiting to be transferred. When the counted number reaches a predetermined number, the transfer latency counting unit 124 assigns the highest priority to the target waiting LP, and outputs, to the selection unit 125, an ID of the target LP with priority information and a switching request signal in order to switch currently transferred context data to context data of the target LP.

The selection unit 125 receives the mode selection information 114 from the transfer mode storage unit 11. Based on the mode selection information 114, the selection unit 125 selects (i) the priority information from the priority storage unit 121 or (ii) the priority information generated by the execution time comparing unit 122, and outputs the selected priority information. However, as described below, when the selection unit 125 receives a switching request signal from the interruption information generating unit 123 or the transfer latency counting unit 124, the selection unit 125 accepts respective a LP ID generated by the interruption information generating unit 123 or the transfer latency counting unit 124.

The data transfer information generating unit 126 receives the transfer mode information 110 from the transfer mode storage unit 11, and the selected priority information from the selection unit 125. Then, the data transfer information generating unit 126 outputs (i) continuous-transfer processor ID information 127 which represents IDs of continuous-transfer processors, (ii) non-continuous-transfer processor ID information 128 which represents IDs of processors each of which transfers plural contexts (plural pieces of context data) separately per cycle, not continuously (hereinafter, referred to as a non-continuous transfer processor), (iii) and transfer stop information 129 which is used to stop transferring of context data.

As one example, it is assumed: that the number of memories in the shared memory 30 (M) is 3 in the system; the continuous-transfer processor number 111 is "1" in the transfer mode information 110; and according to the information from the selection unit 125, a processor P(1) executes LP(1), a processor P(2) executes LP(2), a processor P(3) executes LP(3), and priorities of LP(1), LP(2), LP(3) are "2", "1", and "3", respectively. In this situation, the data transfer information generating unit 126 outputs, as the continuous-transfer processor ID information 127, "2" that is an ID of the processor P(2) executing LP(2). Further, the data transfer information generating unit 126 outputs, as the non-continuous-transfer processor ID information 128, "1" and "3" which are IDs of the processors P(1) and P(3) executing LP(1) and LP(3), respectively.

As discussed below, when a context switching request occurs, the data transfer information generating unit 126 further outputs transfer stop information 129 to switch a currently operating processor to a processor regarding a higher-priority LP.

Figure 6:
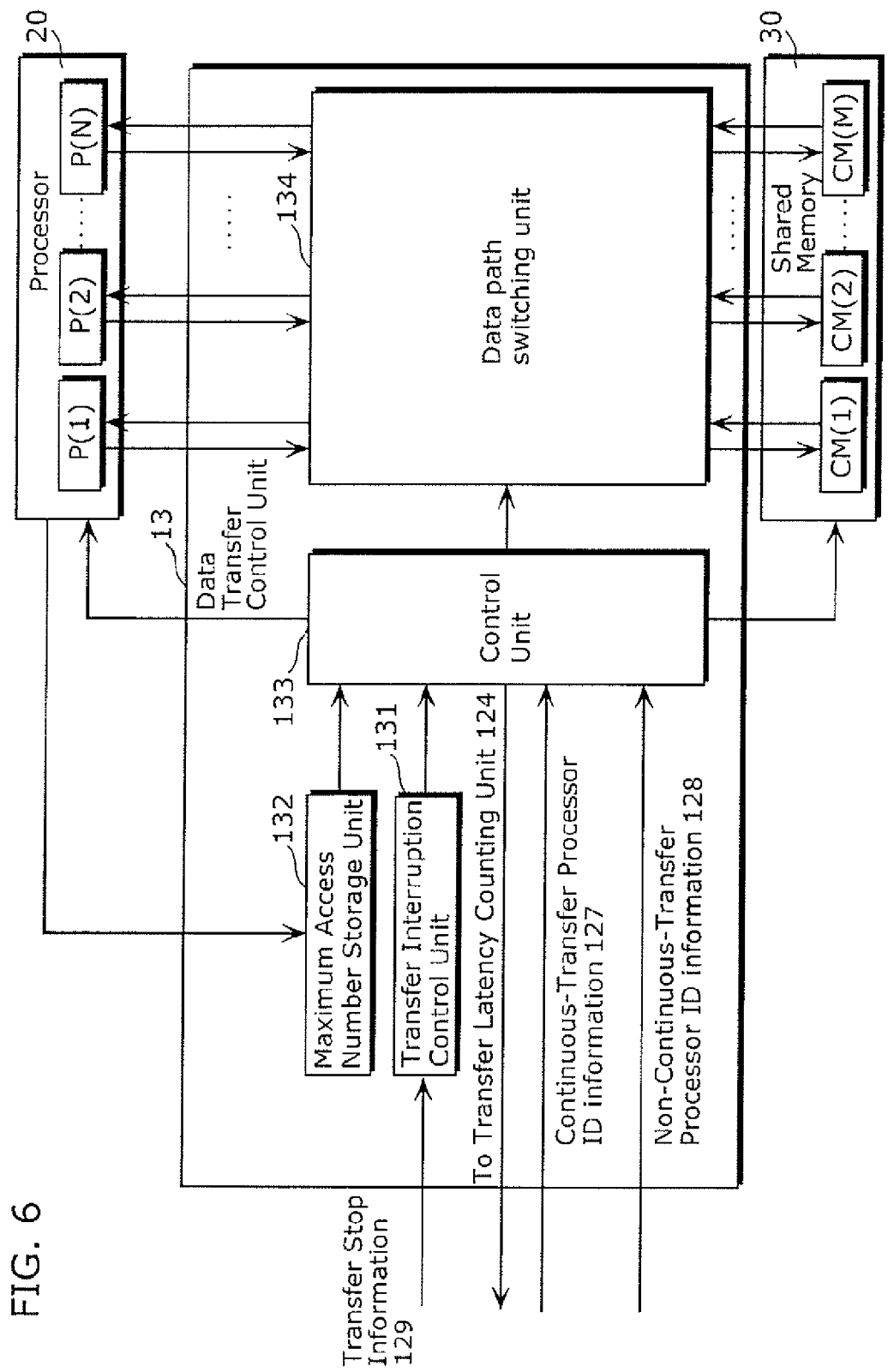
FIG. 6 is a functional block diagram of a data transfer control unit 13.

Next, a structure of the data transfer control unit 13 is described with reference to FIG. 6.

The data transfer control unit 13 includes, as mentioned above, the transfer stop control unit 131, the maximum access number storage unit 132, the control unit 133, and the data path switching unit 134.

The transfer stop control unit 131 receives the transfer stop information 129 from the priority determination unit 12, and if certain context data is currently being transferred, outputs, to the control unit 133, (i) information instructing to stop the transferring and (ii) information instructing to transfer context data of a processor whose ID is included in the transfer stop information 129.

The maximum access number storage unit 132 holds the number of processors which can be operated simultaneously in parallel in the processor 20. The processor 20 stores the number into the maximum access number storage unit 132.

The control unit 133 receives the continuous-transfer processor ID information 127 and the non-continuous-transfer processor ID information 128, and outputs control information to the data path switching unit 134 in order to control the data path switching unit 134.

Moreover, the control unit 133 outputs, to the processor 20 and the shared memory 30, enable information which indicates an address of context data and a timing of accessing the data.

According to the control information from the control unit 133, the data path switching unit 134 switches connection of a data line between: each processor P(k) (where k=1 to N) in the processor 20; and each memory CM(j) (where j=1 to M) in the shared memory 30.

Next, processing performed by the context switching device 10 is described with reference to the drawings. It is assumed in the first embodiment that the number of contexts (context data) for each LP is equally ten, and one processor can transfer one context (context data) in one cycle. The above assumption is defined only for convenience of the explanation, and the present invention is not limited to this assumption.

FIG. 7 shows timing charts of context data transfer, when the continuous-transfer processor number 111 is selected to be used in context switching processing, as effective information.

Here, it is assumed that the continuous-transfer processor number 111 is set to a value of "2", and the selection information 113 is set to a certain value so that the above-set continuous-transfer processor number 111 becomes effective. Further, the mode selection information 114 is set so that the selection unit 125 selects priority information obtained from the priority storage unit 121, as effective priority information. Still further, the processor 20 has up to N (where N=3) processors, and the shared memory 30 has up to M (where M=2) memories, in other words, the shared memory 30 can receive accesses simultaneously from two processors.

It is also assumed that, after task switching, P(1), P(2), and P(3) are to execute LP(1), LP(2), and LP(3), respectively, and that the LP(1), LP(2), and LP(3) are assigned with priority information "1", "3", and "2", respectively, in the priority storage unit 121. In the first embodiment, transferring of contexts (context data) means retrieving of contexts (context data) of each LP.

FIG. 7(*a*) is a timing chart where context switching requests regarding three logical processors LP(1), LP(2), and LP(3) occur at time T0. In FIG. 7(*a*), each of the LPs is represented by each processor ID. The continuous-transfer processor ID information 127 is generated as [1, 3], based on the continuous-transfer processor number 111 "2", and the selected priority information.

Non-continuous-transfer processor ID information 128 indicates processors ID which are not included in the continuous-transfer processor ID information 127, so that in this example, the non-continuous-transfer processor ID information 128 becomes [2].

Based on [1, 3] of the continuous-transfer processor ID information 127 and [2] of the non-continuous-transfer processor ID information 128, the control unit 133 and the data path switching unit 134 transfer all contexts of LP(1) and LP(3) in 10 cycles from time T0. Then, at time T 10 at which the above transferring is completed, further transfer of contexts of remaining LP(2) starts.

As a result, both transferring regarding LP(1) and LP(3) are completed after 10 cycles from the switching request. However, the transferring regarding LP(2) is completed after 20 cycles from the switching request.

On the other hand, FIG. 7(b) shows another context data transfer, which is performed according to setting similar to the setting used in the context data transfer of FIG. 7(a), with difference that the continuous-transfer processor number 111 is set to a value of "1". In this case, continuous-transfer processor ID information 127 becomes [1], and non-continuous-transfer processor ID information 128 becomes [3, 2].

Based on [1] of the continuous-transfer processor ID information 127 and [3, 2] of the non-continuous-transfer processor ID information 128, the control unit 133 and the data path switching unit 134 transfer contexts of LP(1) in first 10 cycles from time T0.

On the other hand, contexts of LP(3) and LP(2) are transferred alternately per cycle, one by one. However, after time T10 at which the transferring regarding LP(1) is completed, contexts of LP(3) and contexts of LP(2) are transferred continuously, respectively.

As a result, the transferring regarding LP(1) is completed after 10 cycles from the switching request, and the transferring regarding LP(3) and LP(2) is completed after 15 cycles from the switching request.

As compared with FIG. 7(a), the transferring regarding LP(3) requires 5 more cycles, but entire transferring regarding LP(1), LP(2), and LP(3) can eliminate 5 cycles, as a result.

FIGS. 8 and 9 are timing charts of context data transfer, where setting of the continuous-transfer processor number 111 is selected to be used in context switching processing, as effective information. In FIGS. 8 and 9, it is assumed that the processor 20 has up to N (where N=4) processors, and the shared memory 30 has up to M (where M=3) memories.

It is also assumed that, after task switching, P(1), P(2), P(3), P(4) are to execute LP(1), LP(2), LP(3), and LP(4), respectively, and that the LP(1), LP(2), LP(3), and LP(4) are assigned with priority information "1", "4", "2", and "3", respectively.

As shown in FIG. 8(a), if the continuous-transfer processor number 111 is set to a value of "3", transferring of contexts of LP(1), LP(3), and LP(4) are completed after 10 cycles from a switching request, and transferring of contexts of LP(2) is completed after 20 cycles from the switching request.

On the other hand, as shown in FIG. 8(b), if the continuous-transfer processor number 111 is set to a value of "2", the transferring regarding LP(1) and LP(3) are completed after 10 cycles from the switching request, and transferring regarding LP(4) and LP(2) are completed after 15 cycles from the switching request.

Moreover, as shown in FIG. 9(a), if the continuous-transfer processor number 111 is set to a value of "1", transferring of contexts of LP(1) is completed after 10 cycles from the switching request, transferring of contexts of LP(3) and LP(4) are completed after 12 cycles from the switching request, and transferring of contexts of LP(2) is completed after 13 cycles from the switching request.

As shown in FIG. 9(b), if the continuous-transfer processor number 111 is set to a value of "0", context data transfer is completed at the time same in the context data transfer of FIG. 9(a).

Next, a situation, where setting of the context transfer attribute 112 is selected to be used in context switching processing, as effective information, is described.

FIGS. 10 and 11 are timing charts of context data transfer. In FIGS. 10 and 11, it is assumed that where the processor 20 has up to N (where N=3) processors, the shared memory 30 has up to M (where M=2) memories, the processor 20 can execute up to S (where S=6) LPs, context transfer attributes 112 of LP(1), LP(2), and LP(4) are "continuous transfer", and context transfer attributes 112 of LP(3), LP(5), and LP(6) are "non-continuous transfer".

In FIG. 10(a), it is assumed that, after task switching, the processors P(1), P(2), and P(3) are to execute LP(1), LP(2), and LP(3), respectively, but the context data transfer by the three processors are conflicted.

Since the context transfer attributes 112 of LP(1) and LP(2) are "continuous transfer", transferring contexts of LP(1) and LP(2) are completed after 10 cycles from time T0 at which a switching request occurs, and transferring contexts of LP(3) starts from time T10.

On the other hands, FIG. 10(b) shows another context data transfer. In FIG. 10(b), it is assumed that, after task switching, the processors P(1), P(2), and P(3) are to execute LP(4), LP(5), and LP(6), respectively, and context data transfer by the three processors are conflicted.

Since only the context transfer attribute of LP(4) is "continuous transfer", transferring regarding P(1) for LP(4) is completed after 10 cycles from time T0 at which the switching request occurs. On the other hand, transferring regarding P(2) and P(3) for LP(5) and LP(6) start from time T0, by transferring contexts alternately per cycle between P(2) and P(3). However, from time T10, P(2) and P(3) respectively perform continuous-transfer of respective contexts, and both transferring are completed at time T15.

FIG. 11(a) shows context data transfer, assuming that, after task switching, the processors P(1), P(2), and P(3) to execute LP(1), LP(2), and LP(4), respectively, but context data transfer by the three processors are conflicted.

Here, all of the context transfer attributes of LP(1), LP(2), and LP(4) are "continuous transfer". However, since the shared memory 30 has up to M (where M=2) memories, all of the continuous-transferring can not be performed at the same time. In this case, a LP having a smaller LP ID is treated as a higher-priority LP. Therefore, continuous-transfer regarding P(1) and P(2) for LP(1) and LP(2) are performed until 10 cycles from time T0, and from time T10, continuous-transfer regarding P(3) for LP(4) starts. As a result, the entire context data transfer is completed at the time same in the context data transfer as shown in FIG. 10(a).

In the above example, it has been described that a LP having a smaller LP number is treated as a higher-priority LP. However, the method of deciding the priorities is not limited to this example.

FIG. 11(b) shows context data transfer, assuming that, after task switching, the processors P(1), P(2), and P(3) are to execute LP(3), LP(5), and LP(6), respectively, but context data transfer by the three processors are conflicted.

Here, all of the context transfer attributes of LP(1), LP(2), and LP(4) are "non-continuous transfer". Therefore, from time T0, contexts of LP(3), LP(5), and LP(6) are transferred by turns per cycle among P(1), P(2), and P(3). The entire context data transfer is completed after 15 cycles.

As described above, by designating a LP whose contexts are to be transferred in 10 cycles, it is possible to complete the data transferring surely in 10 cycles, as far as there are up to M conflicts in data transfer.

Further, regarding other LPs whose context are not to be transferred in 10 cycles, by setting context transfer attributes of those LPs as "non-continuous transfer", it is possible to complete entire context data transfer earlier, in the same manner described for the content data transfer of FIG. 7(b).

Next, a situation, where priority information generated by the execution time comparing unit 122 is selected as effective priority information, is described with reference to the drawings. The mode selection information 114 is set to indicate that the selection unit 125 is to select information generated by the execution time comparing unit 122 and output the selected information to the data transfer information generating unit 126.

Figure 12:
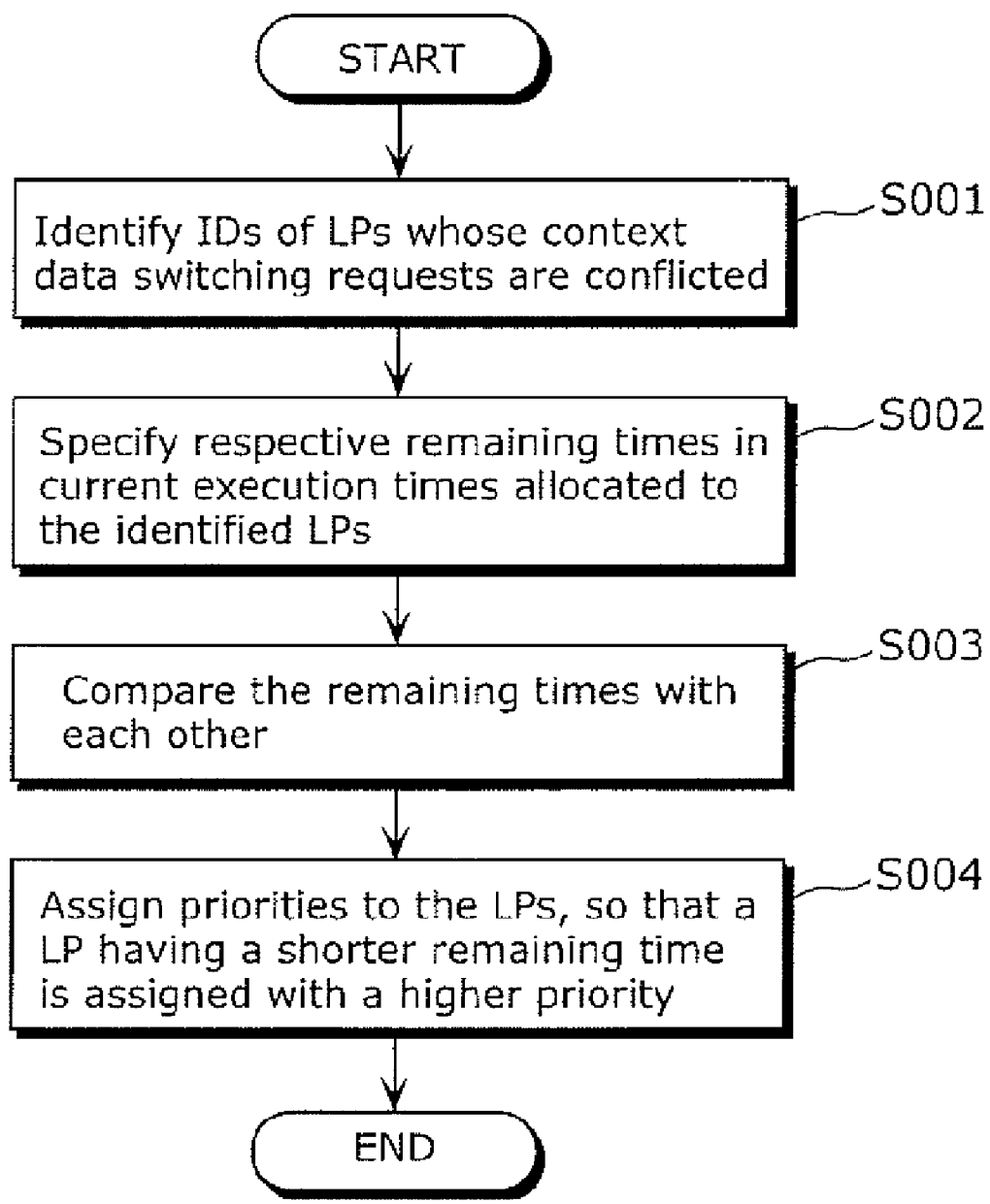
FIG. 12 is a flowchart showing processing performed by an execution time comparing unit 122.
Figure 13:
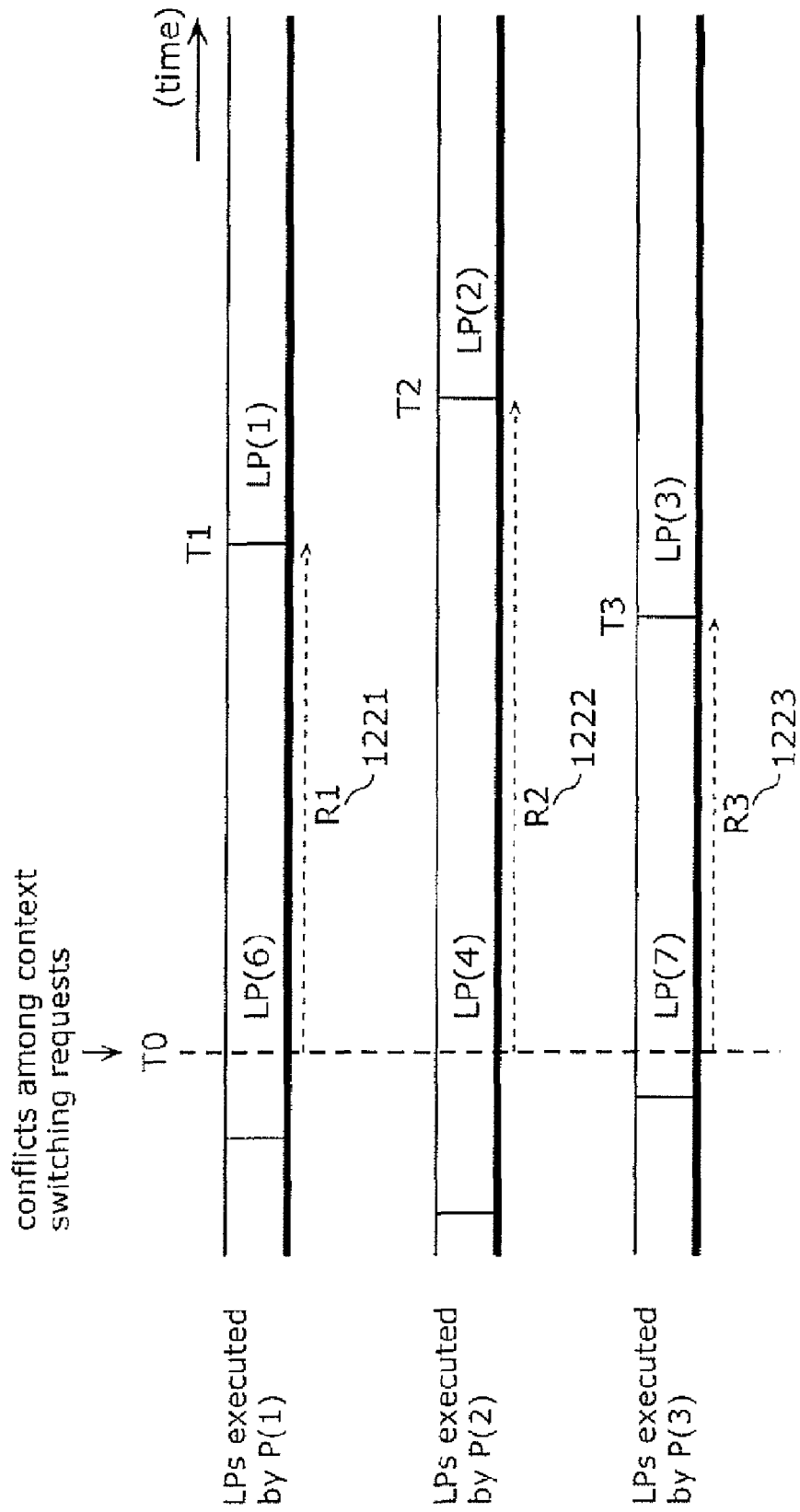
FIG. 13 is a diagram showing one processing example for explaining the flowchart of FIG. 12.

FIG. 12 is a flowchart showing processing performed by the execution time comparing unit 122. FIG. 13 shows a processing example for explaining the flowchart of FIG. 12.

Here, it is assumed that switching requests for switching context data regarding processors P(1), P(2), and P(3) occur simultaneously at time T0. The P(1), P(2), and P(3) are to execute LP(1), LP(2), and LP(3), respectively, after task switching.

Firstly, at Step S001, the execution time comparing unit 122 identifies IDs of LPs whose switching requests are conflicted. In FIG. 13, such LPs whose switching requests are conflicted are LP(1), LP(2), and LP(3), so that the identified LP IDs are "1", "2", and "3", respectively.

Then, at Step S002, the execution time comparing unit 122 specifies a remaining time in an execution time allocated to each currently executing LP by a processor corresponding to each LP identified at Step S001. In FIG. 13, remaining times for LP(1), LP(2), and LP(3) are R1 (reference numeral 1221), R2 (reference numeral 1222), and R3 (reference numeral 1223), respectively.

At Step S003, the execution time comparing unit 122 compares the remaining times specified at Step S002, one another. In FIG. 13, the remaining times are getting longer gradually in an order of R3, R1, and R2.

Finally, at Step S004, the execution time comparing unit 122 assigns the identified LPs with respective priority information, so that a LP whose remaining time is shorter is assigned with a higher priority. In FIG. 13, priority information of LP(3) is generated as "1", priority information of LP(1) is generated as "2", and priority information of LP(2) is generated as "3".

The processing of the context data transfer performed after the generation of the priority information by the execution time comparing unit 122 has been described with reference to FIG. 10, so that the transfer processing is not described again below.

As described above, the priorities of switching contexts are determined by comparing remaining times until task switching, so that frequencies of completion of context switching by the task switching becomes higher, even if plural context switching are conflicted.

Next, processing in which the transfer interruption control unit 131 is selected to be used in context switching processing is described. FIG. 14 shows timing charts of context data transfer, where the transfer interruption control unit 131 is selected to be used in context switching processing.

It is assumed that the context transfer attribute 112 of all LP(1), LP(2), and LP(3) are set to "continuous transfers", and the selection information 113 is set to a value so that the context transfer attribute 112 becomes effective. Further, the mode selection information 114 is set so that the selection unit 125 selects priority information generated by the priority storage unit 121 to be used in context switching processing, as effective information. Still further, the processor 20 has up to N (where N=3) processors, and the shared memory 30 has up to M (where M=2) memories, in other words, the shared memory 30 can receive accesses simultaneously from two processors. It is also assumed that, after task switching, processors P(1), P(2), and P(3) are to execute LP(1), LP(2), and LP(3), respectively, and the LP(1), LP(2), and LP(3) are assigned with priority information "1", "3", and "2", respectively, in the priority storage unit 121.

In FIG. 14(a), at time T0, switching request for switching contexts of LP(1) and LP(2) occur. Since the continuous-transfer processor number 111 is set to "2", both of contexts of LP(1) and contexts of LP(2) are transferred continuously at the same time.

FIG. 14(b) shows a situation where a switching request for contexts of LP(3) occurs at time T2 in FIG. 14(a). Here, since the priority of LP(3) is higher than the priority of LP(2), transferring of contexts of LP(2) is stopped temporarily and transferring of contexts of LP(3) starts. Since the context transfer attributes 112 of LP(1), LP(2), and LP(3) are set to "continuous transfer", both contexts of LP(1) and contexts of LP(3) are transferred continuously, and both transferring are completed after 10 cycles from respective starting.

Transferring regarding P(1) is completed at time T10, so that the temporarily stopped transferring regarding P(2) is resumed from time T10.

Note that the above-described the context data switching request for LP(3) is generated also by the interruption information generating unit 123. When an interrupt signal 400 is inputted from the outside, the interruption information generating unit 123 identifies an ID of a LP corresponding to the interrupt signal 400, and further specifies priority information of the identified LP. Then, the interruption information generating unit 123 outputs, to the selection unit 125, the obtained ID, the specified priority information, and a switching request signal for the identified LP.

Here, information for associating the interrupt signal 400 with LP IDs is stored in the priority storage unit 121, and the processor 20 can set the information.

Here, in the processing of FIG. 14, another situation in the parallel processing system is assumed so that two interrupt signals 400 are associated with LP(1) and LP(3), respectively, and that the number of contexts in one LP is more than 10, which is the original assumption number in the first embodiment. In this situation, when the interrupt signals 400 are inputted frequently, there is a problem that transferring of contexts of LP(2) has to wait for a long time. In order to solve this problem, based on information from the control unit 133, the transfer latency counting unit 124 counts how many times target transferring is skipped, in other words, the number of LPs which have transferred prior to the transferring regarding P(2), after the transferring goes into a status of waiting. The transfer latency counting unit 124 holds information regarding the counted number of the transfer waiting of LP(2). When the number counted by the transfer latency counting unit 124 reaches a predetermined number, the highest priority is assigned to LP(2), and outputs, to the selection unit 125, an ID of LP(2), the assigned priority information, and a switching request signal in order to switch current context data to context data of LP(2).

Note that, the above has described for the predetermined maximum number of the transfer waiting of LP(2), such predetermined number can be set for each LP. Further, a functional block holding the information is not limited to the transfer latency counting unit 124, but may be the priority storage unit 121, for examples. Furthermore, the information regarding the predetermined number of transfer waiting can be set by the processor 20.

Note also that it has been described that the shared memory 30 can be accessed by up to M processors simultaneously. This structure can be realized using a multi-port memory having M input-ports and M output-ports, for example.

Further, the shared memory 30 can be also realized by connecting M single-port memories in parallel. However, LPs are executed arbitrarily in random order by the processor 20, so that if, for example, all contexts of LP(1) are stored in a single-port memory CM(1), conflicts are inevitable among accesses to the memory CM(1). In order to solve this problem, there is a method by which context data is stored as shown in FIG. 15(*a*) as one example, and the data is accessed in an interleave method as shown in FIG. 15(*b*).

Figures 15A, 15B:
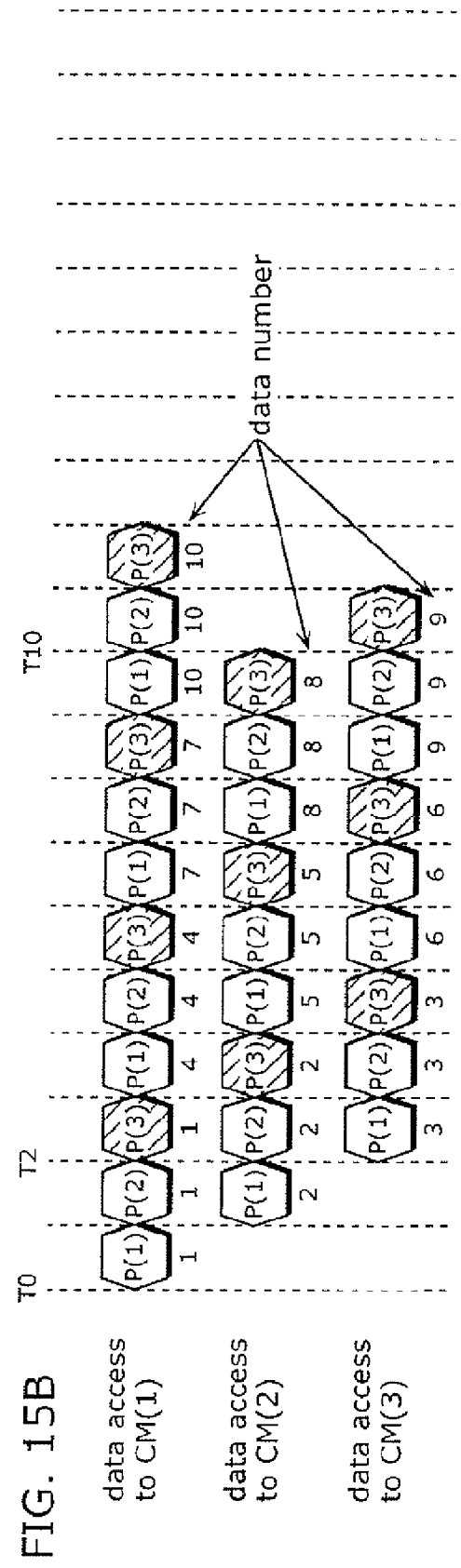
FIG. 15A is diagram showing one example of a structure of a shared memory 30.
FIG. 15B is a timing chart of context data transfer.

In FIG. 15(*a*), a memory CM(1) holds: contexts LP(1)_1, LP(1)_4, LP(1)_7, and LP(1)_10 for execution of LP(1); and contexts LP(2)_1, LP(2)_4, LP(2)_7, and LP(2)_10 for execution of LP(2). An additional letter, such as "_1" in LP(1)_1, is a data number allocated to each context. Such additional letter is also assigned to each context stored in other memories CM(2) and CM(3).

FIG. 15(*b*) shows a timing chart of accesses to the memories (1), (2), and (3), in which data numbers correspond to respective data numbers in FIG. 15(*a*). Using the data storing method of FIG. 15(*a*) and the data accessing method of FIG. 15(*b*), even if accesses for LPs occur in an arbitrary order of LP IDs simultaneously, the processors can access in parallel simultaneously, as far as the number of accessing processors is up to three.

In the above example, the number of processors has been described as "3" for convenience of explanation. Such number of processors are also operable in the above-described M simultaneous parallel accessing. Further, the accessing method shown in FIG. 15(*b*) is merely one example, and the accessing method is not limited to this example.

Note that, if the shared memory 30 has M single-port memories connected in parallel, setting of the number of using memories is stored in the maximum access number storage unit 132 used in the M memories.

In general, a storage capacity of the shared memory 30 is determined from the number of embedded LPs "S". However, in some applications, the number of operating LPs is less than the number of total embedded LPs. For example, even if the number of embedded LPs is "8", in some applications, only four LPs are used. In such a case, if M, which is the number of embedded memories in the shared memories 30 (assumingly equal to the number of processors which can simultaneously accesses the memories) is 4, two memories are enough for a capacity of the shared memory 30.

Here, the maximum access number storage unit 132 is set to a value of "2". The control unit 133 controls the data switching unit 134, according to the setting that M, which is the number of processors which can simultaneously access the memories is "2". The controlling is not explained with reference to the drawings, but in the controlling, only memories corresponding M simultaneous accessible processors are operated in the shared memory 30, and power supply for other memories is stopped. Thereby, power consumption can be reduced.

Note that the first embodiment has been described for the retrieving of contexts, but saving of contexts is performed in the same manner as described for the retrieving.

Moreover, when the context retrieving and the context saving are conflicted with each other, the number of memories or ports in the shared memory is increased, or the data transfer is controlled in the same manner described in the first embodiment, so that data transfer can be performed efficiently.

Note that the structure described in this first embodiment has been given for convenience of explanation, but the first embodiment is not limited to the structure.

Second Embodiment

The second embodiment according to the present invention is described with reference to the drawings.

The second embodiment has the same structure as shown in FIG. 3, but differs from the first embodiment in a function of the execution time comparing unit 122.

Figure 16:
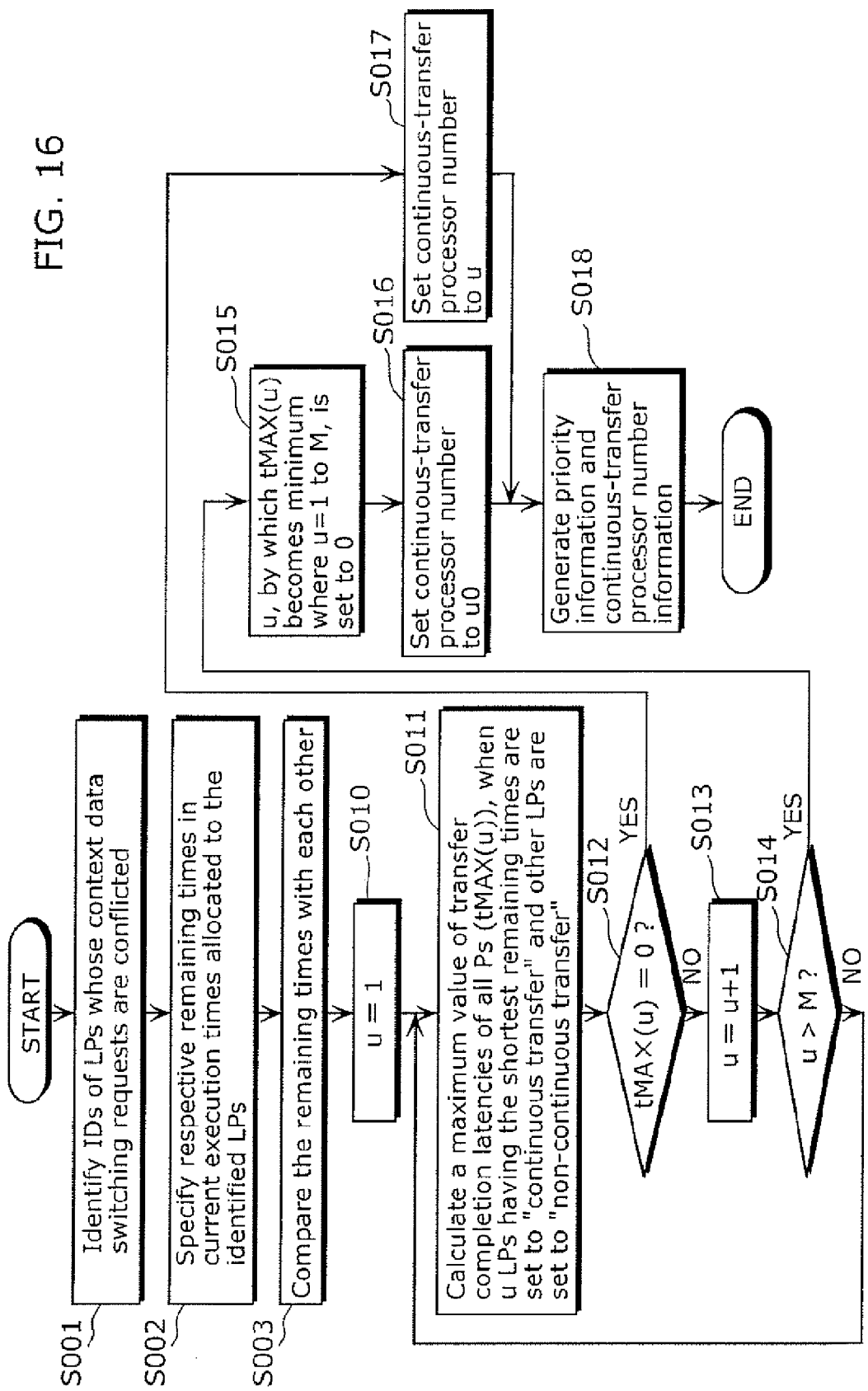
FIG. 16 is a flowchart showing processing performed by the execution time comparing unit 122, according to the second embodiment of the present invention.

FIG. 16 is a flowchart showing processing performed by the execution time period comparing unit 122 according to the second embodiment of the present invention. The Steps from S001 to S1003 are equivalent to the steps in FIG. 12, so that these steps are not described again below.

From Step S010 to Step S018, the execution time comparing unit 122 varies the continuous-transfer processor number within a range of 1 to M, in order to search for the number of continuous-transfer processors by which each context data transfer can be completed within each time period allocated to each processor for each continuous-transfer processor number, and sets the found number to as the continuous-transfer processor number.

If there is no such number, then the execution time comparing unit 122 searches for the number of continuous-transfer processors by which tMAX, which is a maximum value of latencies for of context data transfer completion of all processors, becomes minimum.

Then, after deciding the continuous-transfer processor number, priority information of each LP and the determined continuous-transfer processor number information are outputted to the selection unit 125.

Note that, in the second embodiment, the transfer mode information 110 is not used. This means that the continuous-transfer processor number in the second embodiment is different from the continuous-transfer processor number 111 in the transfer mode information 110.

Next, FIG. 17 shows timing charts of processing of FIG. 16. Here, it is assumed that the processor 20 has up to N (where N=3) processors, and the shared memory 30 has up to M (where M=2) memories. It is also assumed that task switching timings for P(1), P(2), and P(3) are T11, T13, and T21, respectively.

FIG. 17(*a*) is a timing chart where the continuous-transfer processor number is "1". In this case, transferring regarding P(1) and P(2) are completed by the respective task switching timing, but transferring regarding P(3) is not completed by the task switching timing.

On the other hand, FIG. 17(*b*) is a timing chart where the continuous-transfer processor number is "2". In this case, all of transferring regarding P(1), P(2), and P(3) are completed by the task switching timing. In other words, tMAX(2) becomes a value of "0".

As a result, the continuous-transfer processor number information generated at Step S018 becomes [2].

Further, another example is described with reference to FIG. 18. It is assumed in FIG. 18 that task switching timings for P(1), P(2), and P(3) are T11, T13, and T13, respectively.

FIG. 18(*a*) is a timing chart where the continuous-transfer number is "1". In this case, transferring regarding P(1) is completed by the task switching timing, but transferring regarding P(2) and P(3) are not completed by the respective task switching timings.

On the other hand, FIG. 18(b) is a timing chart where the continuous-transfer processor number is "2". In this case, transferring regarding P(1) and P(3) are completed by the respective task switching timings, but transferring regarding P(2) is not completed by the task switching timing.

In both cases in FIGS. 18(a) and (b), since a value of tMAX does not become "0", a size of the value of tMAX is evaluated.

In FIG. 18(a), the switching timings of P(1), P(2), and P(3) have latencies of 0 cycle, 2 cycles, and 2 cycles, respectively, so that a value of tMAX(2) becomes a value of "2".

In FIG. 18(b), the switching timings of P(1), P(2), and P(3) have latencies of 0 cycle, 7 cycles, and 0 cycle, respectively, so that a value of tMAX(2) becomes a value of "7".

Thus, the continuous-transfer processor number information generated at Step S018 should be continuous-transfer processor number by which the value of tMAX becomes minimum, so that the continuous-transfer processor number is determined as [1].

Note that the second embodiment can be realized as a circuit executing the processing according to the flowchart of FIG. 18, or can be a structure in which a part or all of the processing is previously embedded as a numeric value table, using the processor number N, the simultaneous parallel access number M to the shared memory, the number of remaining cycles in the execution time, and the like.

Note also that, in the second embodiment, estimation has been performed to minimum context transfer completion latency of all processors. However, there is also another method by which a specific LP is always assigned with a high priority. What is evaluated is not limited to the above-described examples.

Note that the structure described in the second embodiment is one example for convenience of explanation, and the second embodiment is not limited to the example.

Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of this invention,

INDUSTRIAL APPLICABILITY

The context switching device according to the present invention can be applied to a reproduction apparatus and a video reproduction apparatus which use plural processors in parallel to execute music reproduction or video reproduction in a mobile apparatus or the like, such as a portable telephone.

What is claimed is:

1. A context switcher used in a parallel processing system having: N processors which execute programs that are switched to be executed; and a shared memory which has M access ports, where M<N, that holds pieces of context data, the pieces of context data being used by the N processors to execute the programs and being obtained from the N processors, said context switcher performing the switching by transferring a corresponding piece of the pieces of context data from the shared memory to a processor Y of the N processors before the processor Y executes a program X of the programs, and transferring the corresponding piece of the pieces of context data from the processor Y to the shared memory after the processor Y executes the program X, said context switcher comprising:

a transferrer that transfers the pieces of context data, according to one of a first transfer mode in which the pieces of context data are transferred continuously through cycles to a predetermined processor, and a second transfer mode in which the pieces of context data are transferred alternately per cycle by switching respective processors of the pieces of context data; and a controller that (i) holds priority information including priorities of processing requests of the N processors for switching, (ii) when requests for switching, among P processors of the N processors, conflict, where M<P<=N, decides which processor of the P processors is to be used in the first transfer mode and which processors of the P processors is to be used in the second transfer mode, depending on priorities included in the priority information, and (iii) transfers the pieces of context data of the P processors, based on the decision.

2. The context switcher according to claim 1,
wherein the shared memory includes plural memories, and
said transferrer concurrently transfers the pieces of context data for the respective processors, by accessing the plural memories of the shared memory using an interleave method.

3. The context switcher according to claim 1,
wherein said transferrer includes:
a maximum access number storage that holds information related to a maximum number of processors to and from which the pieces of context data are concurrently transferred in parallel, and
said transferrer transfers context data corresponding to a number that is less than the maximum number held in said maximum access number storage, the pieces of context data corresponding to the number that is less than the maximum number being inputted and outputted in parallel, per cycle, when the transferrer transfers the pieces of context data.

4. The context switcher according to claim 1,
wherein the shared memory includes multi-port memories which M processors of the P processors access concurrently.

5. A context switcher used in a parallel processing system having: N processors which execute programs that are switched to be executed; and a shared memory which has M access ports, where M<N, that holds pieces of context data, the pieces of context data being used by the N processors to execute the programs and being obtained from the N processors, said context switcher performing the switching by transferring a corresponding piece of the pieces of context data from the shared memory to a processor Y of the N processors before the processor Y executes a program X of the programs, and transferring the corresponding piece of the pieces of context data from the processor Y to the shared memory after the processor Y executes the program X, said context switcher comprising:

a transferrer that transfers the pieces of context data, according to one of a first transfer mode in which the pieces of context data are transferred continuously through cycles to a predetermined processor, and a second transfer mode in which the pieces of context data are transferred alternately per cycle by switching respective processors of the pieces of context data; and a controller that (i) holds priority information including priorities of processing requests of the N processors for switching, (ii) when requests for switching, among P processors of the N processors, conflict, where M<P<=N, decides which processor of the P processors is to be used in the first transfer mode and which processor of the P processors is to be used in the second transfer mode, depending on priorities included in the priority information, and (iii) transfers pieces of context data of the P processors based on the decision, wherein said controller includes:

a transfer mode storage which holds pieces of transfer mode information, each of which indicates which transfer mode of the first transfer mode and the second transfer mode is to be used to transfer the corresponding piece of the pieces of context data; and a priority determiner that, when (a) there is a conflict in the requests of the P processors for the switching and (b) each of the pieces of transfer mode information of more than M processors of the P processors indicates that the corresponding piece of the pieces of context data is to be transferred in the first transfer mode, determines that more than M processors are being used in the first transfer mode from among the P processors, the more than M processors having higher priorities in the priority information than remaining processors of the P processors.

6. The context switcher according to claim 5, wherein the transfer mode information represents a number of the P processors decided by said controller to be used in the first transfer mode, and said priority determiner determines which of the more than M processors are used in the first transfer mode.

7. The context switcher according to claim 5, wherein the transfer mode information includes an attribute for each of the programs, the attribute indicating which transfer mode of the first transfer mode and the second transfer mode is to be used to transfer the corresponding piece of the pieces of context data before or after each program of the programs is executed by a corresponding one of the N processors.

8. The context switcher according to claim 5, wherein said priority determiner includes:

a priority storage that holds priorities for each of the programs.

9. The context switcher according to claim 5, wherein said priority determiner includes:

an execution time comparer that generates priorities assigned to each of the programs to be executed, based on a remaining time in a current execution time period allocated to each of the N processors, by comparing remaining times among the N processors.

10. The context switcher according to claim 9, wherein a program having a shorter remaining time is assigned a higher priority.

11. The context switcher according to claim 9, wherein said execution time comparer further determines a number of the processors to be used in the first transfer mode to minimize a latency for completing context data transfer in said transferrer, and said transferrer transfers context data corresponding to the number of the processors determined by said execution time comparer to be used in the first transfer mode, and transfers remaining context data according to the second transfer mode.

12. The context switcher according to claim 5, wherein the transfer mode information includes mode selection information, and said priority determiner includes:

an execution time comparer that generates a first priority assigned to each of the programs to be executed, based on a remaining time in a current execution time period allocated to each of the N processors, by comparing remaining times among the N processors;

a priority storage that holds a second priority assigned to each of the programs to be executed; and a selector that selects one of the first priority and the second priority as the priority information, based on the mode selection information.

13. The context switcher according to claim 12, wherein said priority determiner further includes:

a data transfer information generator that generates, based on a priority selected by said selector and the transfer mode information, data transfer information which represents which processor of the P processors is to be used in the first transfer mode and which processor of the P processors is to be used in the second transfer mode.

14. The context switcher according to claim 13, wherein the data transfer information represents an ID of the processor to be used in the first transfer mode and an ID of the processor to be used in the second transfer mode.

15. The context switcher according to claim 5, wherein said priority determiner further includes:

an interrupt information generator that generates interrupt information used to prioritize transfer of the pieces of context data of a processor to execute a program which is to be interrupted by another transfer, and outputs the generated interrupt information to said transferrer.

16. The context switcher according to claim 15, wherein said priority determiner further includes:

a transfer latency counter that counts a latency for transferring the pieces of context data of the interrupted program, and assign a predetermined priority to the interrupted program when the counted latency reaches a predetermined value.

17. The context switcher according to claim 16, wherein the latency represents a number of times transferring the pieces of context data is suspended by other transfers.

18. The context switcher according to claim 5, wherein said transferrer includes:

a transfer stop controller that temporarily stops transferring the pieces of context data of a first processor of the P processors to execute a first program, and transfer, during the stopping, another context data of a second processor of the P processors to execute a second program, the second program being distinct from the first program.

19. A context switching method of switching pieces of context data to be transferred concurrently between a shared memory and one of N processors, said method being used in a parallel processing system having: the N processors which execute programs that are switched to be executed; and the shared memory which has M access ports, where M<N, and holds the pieces of context data, the pieces of context data being used by the N processors to execute the programs and obtained from the N processors, the method comprising:

performing the switching by transferring a corresponding piece of the pieces of context data from the shared memory to a processor Y of the N processors before the processor Y executes a program X of the programs, and transferring the corresponding piece of the pieces of context data from the processor Y to the shared memory after the processor Y executes the program X;

holding priority information in a controller that is used to decide which processor to use in a first transfer mode and which processors to use in a second transfer mode;

deciding (i) which processor to use in the first transfer mode and transfer the pieces of context data continuously through cycles by a processor, and (ii) which processors to use in the second transfer mode and transfer plural pieces of the pieces of context data alternatively per cycle by switching respective processors of the pieces of context data; and transferring the pieces of context data according to one of the first transfer mode and the second transfer mode, based on the decision.

20. A context switching method of switching pieces of context data to be transferred concurrently between a shared memory and one of N processors, said method being used in a parallel processing system having: the N processors which execute programs that are switched to be executed; and the shared memory which has M access ports, where M<N, and holds the pieces of context data, the pieces of context data being used by the N processors to execute the programs and obtained from the N processors, the method comprising:

performing the switching by transferring a corresponding piece of the pieces of context data from the shared memory to a processor Y of the N processors before the processor Y executes a program X of the programs, and transferring the corresponding piece of the pieces of context data from the processor Y to the shared memory after the processor Y executes the program X;

deciding (i) which processor to use in a first transfer mode and transferring the pieces of context data continuously through cycles by a processor, and (ii) which processors to use in a second transfer mode and transfer plural pieces of the pieces of context data alternatively per cycle by switching respective processors of the pieces of context data; and transferring the pieces of context data according to one of the first transfer mode and the second transfer mode, based on the decision, wherein a controller in the parallel processing system includes:

a transfer mode storage which holds pieces of transfer mode information, each of which indicates which transfer mode of the first transfer mode and the second transfer mode is to be used to transfer the corresponding piece of the pieces of context data, a priority determiner that, when (a) there is a conflict in the requests of the P processors for the switching and (b) each of the pieces of transfer mode information of more than M processors of the P processors indicates that the corresponding piece of the pieces of context data is to be transferred in the first transfer mode, determines that more than M processors are being used in the first transfer mode, from among the P processors, the more than M processors having higher priorities in the priority information than remaining processors of the P processors.

* * * * *